(12) United States Patent
Sharma et al.

(10) Patent No.: US 7,475,142 B2
(45) Date of Patent: Jan. 6, 2009

(54) CIFS FOR SCALABLE NAS ARCHITECTURE

(75) Inventors: Samar Sharma, Sunnyvale, CA (US);
Dinesh G Dutt, Sunnyvale, CA (US);
Sanjaya Kumar, Fremont, CA (US);
Umesh Mahajan, Cupertino, CA (US);
Thomas J. Edsall, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 387 days.

(21) Appl. No.: 11/129,100

(22) Filed: May 13, 2005

(65) Prior Publication Data

US 2005/0223014 A1    Oct. 6, 2005

Related U.S. Application Data

(63) Continuation-in-part of application No. 10/313,306, filed on Dec. 6, 2002, now abandoned.

(51) Int. Cl.
*G06F 13/00*    (2006.01)
(52) U.S. Cl. ............... 709/226; 709/224; 718/102; 718/104
(58) Field of Classification Search ........... 709/224, 709/227, 232, 220, 226; 370/338
See application file for complete search history.

(56) References Cited

U.S. PATENT DOCUMENTS

| | | | |
|---|---|---|---|
| 5,208,811 A | 5/1993 | Kashio et al. | |
| 5,278,849 A | 1/1994 | Hall | |
| 5,394,402 A | 2/1995 | Ross | |
| 5,802,319 A | 9/1998 | Faulk et al. | |
| 5,862,311 A | 1/1999 | Fujita | |
| 6,041,058 A | 3/2000 | Flanders et al. | |
| 6,094,575 A | 7/2000 | Anderson et al. | |
| 6,105,029 A | 8/2000 | Maddalozzo et al. | |
| 6,122,287 A | 9/2000 | Ohanian et al. | |
| 6,188,694 B1 | 2/2001 | Fine et al. | |
| 6,324,581 B1 * | 11/2001 | Xu et al. | 709/229 |
| 6,337,846 B1 | 1/2002 | Bengston et al. | |
| 6,374,311 B1 | 4/2002 | Mahany et al. | |

(Continued)

FOREIGN PATENT DOCUMENTS

WO    WO 97/34431    9/1997

(Continued)

OTHER PUBLICATIONS

"Quick Tutorials," www.pse.umass.edu/support/tuip.html, downloaded Apr. 14, 2004.

(Continued)

*Primary Examiner*—Khanh Dinh
(74) *Attorney, Agent, or Firm*—Weaver Austin Villeneuve & Sampson LLP

(57) ABSTRACT

A scalable NAS file system and protocols for implementing CIFS thereon are disclosed. In certain embodiments, the protocols implement the CIFS protocol on a scalable file server architecture having one or more protocol termination nodes, one or more file server nodes, and one or more disk controller nodes. Among the features that may be specifically implemented are tree access, file access, user authentication, locking, state maintenance, and failover of protocol termination nodes and file server nodes.

22 Claims, 9 Drawing Sheets

U.S. PATENT DOCUMENTS

| | | | |
|---|---|---|---|
| 6,401,127 | B1 | 6/2002 | Lei et al. |
| 6,453,354 | B1* | 9/2002 | Jiang et al. ............... 709/229 |
| 6,515,967 | B1 | 2/2003 | Wei et al. |
| 6,667,954 | B1 | 12/2003 | Boduch et al. |
| 6,674,713 | B1 | 1/2004 | Berg et al. |
| 6,674,742 | B1 | 1/2004 | McDonald et al. |
| 6,700,871 | B1 | 3/2004 | Harper et al. |
| 6,772,215 | B1 | 8/2004 | Rathonyi et al. |
| 6,831,898 | B1 | 12/2004 | Edsall et al. |
| 6,853,641 | B2 | 2/2005 | Lindhorst-Ko et al. |
| 6,857,012 | B2* | 2/2005 | Sim et al. ............... 709/222 |
| 6,873,603 | B1 | 3/2005 | Ivaturi |
| 6,937,576 | B1 | 8/2005 | Di Benedetto et al. |
| 6,947,394 | B1 | 9/2005 | Johansson et al. |
| 7,047,287 | B2* | 5/2006 | Sim et al. ............... 709/221 |
| 7,058,014 | B2 | 6/2006 | Sim |
| 7,075,892 | B2 | 7/2006 | Grover et al. |
| 7,126,923 | B1 | 10/2006 | Yang et al. |
| 7,165,095 | B2* | 1/2007 | Sim ............... 709/217 |
| 7,181,523 | B2* | 2/2007 | Sim ............... 709/226 |
| 7,216,159 | B2 | 5/2007 | Hirose et al. |
| 7,280,488 | B2 | 10/2007 | Shibasaki |
| 2002/0083187 | A1* | 6/2002 | Sim et al. ............... 709/235 |
| 2002/0103846 | A1 | 8/2002 | Zisapel et al. ............... 709/105 |
| 2002/0150100 | A1 | 10/2002 | White et al. |
| 2002/0156984 | A1 | 10/2002 | Padovano ............... 711/148 |
| 2003/0005145 | A1 | 1/2003 | Bullard |
| 2003/0067912 | A1 | 4/2003 | Mead et al. |
| 2004/0062248 | A1 | 4/2004 | Nagarajan et al. |
| 2004/0081171 | A1 | 4/2004 | Finn |
| 2004/0109443 | A1 | 6/2004 | Gai et al. |
| 2004/0139167 | A1 | 7/2004 | Edsall et al. |
| 2004/0228339 | A1 | 11/2004 | Gallo et al. |
| 2005/0210479 | A1 | 9/2005 | Andjelic |
| 2005/0259597 | A1 | 11/2005 | Benedetto et al. |
| 2007/0038697 | A1 | 2/2007 | Zimran et al. |
| 2007/0088702 | A1 | 4/2007 | Fridella et al. |
| 2007/0174428 | A1 | 7/2007 | Lev Ran et al. |

FOREIGN PATENT DOCUMENTS

| | | |
|---|---|---|
| WO | WO01/67707 | 9/2001 |
| WO | WO02/08899 | 1/2002 |

OTHER PUBLICATIONS

Field, James A., "Logical Link Control," Apr., 1986, Computers and Communications Integration Design, Analysis, Management, pp. 331-336.

Pujolle, G., "Les Reseaux, 3e Edition Mis A Jour," Feb. 2002, Editions Eyrolles, pp. 68-69.

International Search Report in corresponding PCT application PCT/US03/37123 mailed May 24, 2004.

International Search Report is corresponding PCT application PCT/US03/37234 mailed Dec. 16, 2004.

"Information technology—Telecommunications and information exchange between systems—Local and metropolitan area networks—Specific requirements—Part 2: Logical Link Control", International Standard ISO, ANSI/IEEE Std 802.2, 1998 edition.

Peter J. Braam, "The Coda Distributed File System", www.coda.cs.cmu.edu/ljpaper/lj.html, Nov. 20, 2002.

Office Action dated Jul. 3, 2006 from related U.S. Appl. No. 10/313,306 (ANDIP017).

Office Action dated Dec. 19, 2006 from related U.S. Appl. No. 10/313,306 (ANDIP017).

Edsall et al., "Multiple Packet Paths to Improve Reliability in an IP Network", U.S. Appl. No. 09/593,566, filed Aug. 16, 2000 (Pat. No. 6,831,898).

Vinton G. Cerf and Robert E. Kahn, "A Protocol for Packet Network Intercommunication", IEEE Transactions on Communications, vol. Com-22 No. 5, 1974.

RFC 793—Transmission Control Protocol DARPA Internet Program Protocol Specification (Sep. 1981, made available to the general public by the Internet Engineering Task Force at www.ietf.org).

M. O'Dell et al., "Extended Ethernet Frame Size Support, draft-kaplan-isis-ext-eth-02.txt", Network Working Group, Internet Draft, Expiration Date: Nov. 1999.

D. Farinacci, et al., Generic Routing Encapsulation (GRE), RFC 2784, Network Working Group, Request for Comments: 2784, Category: Standard Track, Mar. 2000.

U.S. Office Action dated Jan. 19, 2007 from Related U.S. Appl. No. 10/313,745.

U.S. Office Action dated Apr. 30, 2007 from related U.S. Appl. No. 10/313,745.

U.S. Office Action dated Nov. 26, 2007 from related U.S. Appl. No. 10/313,745.

U.S. Office Action dated Jan. 29, 2007 from related U.S. Appl. No. 10/313,305.

U.S. Office Action dated Jul. 11, 2007 from related U.S. Appl. No. 10/313,305.

U.S. Office Action dated Dec. 19, 2007 from related U.S. Appl. No. 10/313,305.

International Search Report and Written Opinion from dated Nov. 7, 2007 from related PCT Application No. PCT/US2006/018164, 8 pgs..

Notice of Allowance and Allowed Claims dated Jun. 17, 2008 from related U.S. Appl. No. 10/313,305 13 pgs. (ANDIP018).

U.S. Office Action dated Jun. 23, 2008 from related U.S. Appl. No. 10/313,745 17 pgs. (ANDIP023).

* cited by examiner

CIFS FOR SCALABLE NAS ARCHITECTURE

CROSS-REFERENCE TO RELATED APPLICATIONS

This application is a continuation-in-part of U.S. application Ser. No. 10/313,306, titled "Apparatus and Method for A Scalable Network Attach Storage System" by Edsall et. al., filed Dec. 6, 2002, now abandoned which is incorporated herein by reference for all purposes. The present invention is also related to U.S. application Ser. No. 10/313,745, entitled "Apparatus and Method for A High Availability Data Network Using Replicated Delivery" by Edsall et. al. and U.S. application Ser. No. 10/313,305, entitled "Apparatus and Method for a Lightweight, Reliable Packet-Based Protocol" by Gai et. al., both filed on Dec. 6, 2002, and incorporated herein by reference for all purposes.

BACKGROUND

The present invention relates to data storage, and more particularly, to an apparatus and method for a scalable Network Attached Storage (NAS) system.

With the increasing popularity of Internet commerce and network centric computing, businesses and other organizations are becoming more and more reliant on information. To handle all of this data, various types of storage systems have been developed such as Storage Array Networks (SANs) and Network Attached Storage (NAS). SANs have been developed based on the concept of storing and retrieving data blocks. In contrast, NAS systems are based on the concept of storing and retrieving files.

A typical NAS system is a single monolithic node that performs protocol termination, maintains a file system, manages disk space allocation and includes a number of disks, all managed by one processor at one location. Protocol termination is the conversion of NFS or CIFS requests over TCP/IP received from a client over a network into whatever internal inter-processor communication (IPC) mechanism defined by the operating system relied on by the system. Some NAS system providers, such as Network Appliance of Sunnyvale, Calif., market NAS systems that can process both NFS and CIFS requests so that files can be accessed by both Unix and Windows users respectively. With these types of NAS systems, the protocol termination node includes the capability to translate, e.g., CIFS requests into whatever communication protocol is used within the NAS system.

The file system maintains a log of all the files stored in the system. In response to a request from the termination node, the file system retrieves or stores files as needed to satisfy the request. The file system is also responsible for managing files stored on the various storage disks of the system and for locking files that are being accessed. The locking of files is typically done whenever a file is open, regardless if it is being written to or read. For example, to prevent a second user from writing to a file that is currently being written to by a first user, the file is locked. A file may also be locked during a read to prevent another termination node from attempting to write or modify that file while it is being read.

A disk controller handles a number of responsibilities, such as accessing the disks, managing data mirroring on the disks for back-up purposes, and monitoring the disks for failure and/or replacement. The storage disks are typically arranged in one of a number of different well known configurations, such as a known level of Redundant Array of Independent Disks (i.e., RAID1 or RAID5).

The protocol termination node and file system are usually implemented in microcode or software on a computer server operating either the Windows, Unix or Linux operating systems. Together, the computer, disk controller, and array of storage disks are then assembled into a rack. A typical NAS system is thus assembled and marketed as a stand-alone rack system.

A number of problems are associated with current NAS systems. Foremost, most NAS systems are not scaleable. Each NAS system rack maintains its own file system. The file system of one rack does not inter-operate with the file systems of other racks within the information technology infrastructure of an enterprise. It is therefore not possible for the file system of one rack to access the disk space of another rack or vice versa. Consequently, the performance of NAS systems is typically limited to that of single rack system. Certain NAS systems are redundant. However, even these systems do not scale very well and are typically limited to only two or four nodes at most.

There are other drawbacks associated with individual NAS systems. For example, individual NAS systems all have restrictions on the number of users that can access the system at any one time, the number of files that can be served at one time, and the data throughput (i.e., the rate or wait time before requested files are served). When there are many files stored on an NAS system, and there are many users, a significant amount of system resources are dedicated to managing overhead functions such as the locking of particular files that are being access by users. This overhead significantly impedes the overall performance of the system.

Another problem with existing NAS systems is that the performance of the system cannot be tuned to the particular workload of an enterprise. In a monolithic system, there is a fixed amount of processing power that can be applied to the entire solution independent of the workload. However, some workloads require more bandwidth than others, some require more I/Os per second, some require very large numbers of files with moderate bandwidth and users, and still others require very large total capacity with limited bandwidth and a limited total number of files. Existing systems typically are not very flexible in how the system can be optimized for these various workloads. They typically require the scaling of all components equally to meet the demands of perhaps only one dimension of the workload such as number of I/Os per second.

Another problem is high availability. This is similar to the scalability problem noted earlier where two or more nodes can access the same data at the same time, but here it is in the context of take over during a failure. Systems today that do support redundancy typically do in a one-to-one (1:1) mode whereby one system can back up just one other system. Existing NAS systems typically do not support the redundancy for more than one other system.

A NAS architecture that enables multiple termination nodes, file systems, and disk controller nodes to be readily added to the system as required to provide scalability, improve performance and to provide high availability redundancy is therefore needed.

SUMMARY

In certain embodiments, a method of authenticating a user communicating with a scalable network attached storage system via CIFS protocol is provided. The network attached storage system may comprise: (i) one or more protocol termination nodes and (ii) one or more file server nodes in communication with the one or more termination nodes for maintaining file systems. It may also include (iii) one or more disk controller nodes. Preferably, the one or more termination nodes and one or more file server nodes can be added to or deleted from the scalable network attached storage system as needed. Further, the network attached storage system may comprise a switching fabric coupling the one or more termination node, file server nodes, and disk controller nodes.

In certain embodiments, the method comprises the following operations: (a) receiving the user's credential's at a selected termination node; (b) forwarding the user's credentials from the selected termination node to a management entity or domain controller responsible for authenticating users; (c) authenticating the user; and (d) receiving a message, at the selected termination node, indicating authentication to the selected termination node.

The method may also include providing a CIFS Uid to the user from the selected termination node after the selected termination node has received the message indicating that user is authenticated. In certain embodiments, the method employs multiple domain controllers in a NetLogon authentication procedure or pass-through authentication procedure.

Also disclosed is a method of connecting a user to a file system tree maintained on a scalable network attached storage system using CIFS protocol. As before, the scalable network attached storage system comprises (i) one or more termination nodes and (ii) one or more file server nodes in communication with the one or more termination nodes for maintaining file systems. The method may be characterized by the following operations: (a) receiving a SMB TREE_CONNECT message at a selected termination node; (b) determining which file server node is responsible for a tree identified in the TREE_CONNECT message; (c) sending the TREE_CONNECT message to the file server node determined to be responsible; (d) determining a tree ID used by the file server node for the share; (d) providing the tree ID used by the file server node to the selected termination node; (e) generating a Tid at the selected termination node; and (f) sending a response including the Tid to the user. In some embodiments, the Tid is generated on a per client basis.

The method may also comprise updating a data structure on the selected termination node by providing an entry identifying the Tid and at least one of (i) the file server node responsible for the tree identified in the TREE_CONNECT message and (ii) the tree ID used by the file server node for the share.

The method may further comprise determining that a user id in the TREE_CONNECT message has been authenticated. And this may be performed at the selected termination node. In some embodiments, the process will additionally authenticate the user's access to the share. This authentication may be performed by a management process (or other process) on the network attached storage system.

Also provided are methods of allowing a user to access a file system maintained on a scalable network attached storage system using CIFS protocol. In certain embodiments, the method employs the following operations: (a) receiving a Tid from the user at a selected termination node, wherein the Tid identifies a tree in the file system; (b) determining which file server node is responsible for a tree identified by the Tid; (c) sending a request for access to the file server node determined to be responsible; (d) at the responsible file server node, identifying the actual file associated with an operation via an Fid carried in the request, wherein the Fid identifies a file to be accessed; (e) at the responsible file server node, determining that the user has appropriate permissions for that Fid; and (f) allowing the user to access the file. In certain embodiments, the selected termination node additionally determines that the user is authenticated and determines that the Tid provided by the user is valid for that user.

The access may comprise one or more of creating the file, writing to the file, seeking the file, flushing the file, and renaming the file. Further, the access may comprise one or more of (i) moving the file from the tree identified by the Tid to another tree and (ii) copying the file from the tree identified by the Tid to another tree.

Also provided are methods of administering a lock in a scalable network attached storage system, as described above, via CIFS protocol. The method may be characterized by the following operations: (a) at a selected termination node, receiving a request from a client to lock a selected file or portion of a file stored on the network attached storage system; (b) providing the request or at least criteria pertaining to locking from the selected termination node to a file server node responsible for the file for which the lock request was made; and (b) at the file server node, maintaining state information pertaining to the locked file or portion of the file.

In certain embodiments, the file server node maintains a list of client, Tid, Fid (file ID) pairs that have a particular section of an identified file locked. The file server node may also maintain a list of client, Tid, Fid pairs, which have been granted oplocks for an identified file.

The file server node may also determine, in response to the request, whether any other client has a byte range lock that overlaps with the request. In addition, the file server node may need to determine whether any oplocks have been granted on the selected file, and, if so, causing said oplocks to be broken or moved to a lower level.

Another aspect of the invention pertains to methods of performing failover when a protocol termination node fails in a scalable network attached storage system of the type mentioned above. The method may be characterized by the following operations: (a) determining that a protocol termination node has failed, wherein the failed protocol termination node had established a session with a client at the time when it failed; (b) designating another protocol termination node to handle subsequent communication with the client; and (c) starting a new session between the client and the other protocol termination node. The method may further comprise (i) informing a management process of the failover; and (ii) sending clean up messages to one or more file server blocks.

Yet another aspect of the invention pertains to method of performing failover when a file server node fails in a scalable network attached storage system such as the one described herein. The method may be characterized by the following operations: (a) determining that a file server node has failed, wherein the failed file server node was responsible for handling access to one or more file system trees; (b) identifying one or more peer file server nodes to handle the file system trees of the failed file server node; and (c) allowing a client to access one or more files in the file system trees of the failed file server node by providing access through the one or more peer file server nodes identified to handle the file system trees.

The method may involve allowing a client to access a tree handled by the failed file server node when it failed, where the client had established a session with a protocol termination node when the failed file server node failed. When this happens, the method may cause the protocol termination node to close any connections with the client when it is determined that a file server node has failed.

In some cases, when a client is connected when a file server node fails, the state of the client's access to a tree is maintained even though subsequent access is provided through the one or more peer file server nodes identified to handle the file system trees of the failed file system node. In some cases, the network attached storage system further comprises one or more disk controller nodes for accessing storage disks, which stably store said state information.

Other aspects of the invention pertain to apparatus (scalable network attached storage systems) comprising (a) one or more protocol termination nodes, (b) one or more file server nodes in communication with the one or more termination nodes for maintaining file systems, and (c) a switching fabric coupling the one or more termination nodes and file server nodes. As indicated, the one or more termination nodes, file server nodes can be added to or deleted from the scalable network attached storage system as needed. Further, the one or more termination nodes are configured to communicate with users via CIFS protocol. The termination nodes and file server nodes are further configured to perform one or more of the operations described above.

These and other features and advantages of the present invention will be described in more detail below with reference to the associated drawings.

DETAILED DESCRIPTION

The present invention provides algorithms to handle the CIFS SMB primitives on a scalable NAS architecture. A scalable architecture allows more files to be supported, handles multiple server requests very fast, etc. As explained below, an exemplary architecture includes separate blocks dedicated to protocol termination, file serving, and controlling disk access. Among other features, the algorithms described herein allow state to be maintained on each block. They also handle failover of individual blocks, authentication and locking. The NAS architecture and algorithms described herein can be scaled up or down and can be easily implemented. They also increase the system manageability and availability.

In the embodiments described herein, the NAS file system is configured and used in a manner that allows the CIFS protocol to function in a scalable architecture as described herein. CIFS is intended to provide an open cross-platform mechanism for client systems to request file services from server systems over a network. It is a stateful protocol; i.e., the system remembers the state of any given file in the system (e.g., whether the file open, whether it is being written to, who is accessing it, etc.). CIFS uses the Server Message Block (SMB) protocol widely in use by personal computers and workstations running a wide variety of operating systems. Examples of SMB messages include set a tree connection, open a file, read a file, write to a file, close a file, disconnect from a tree, etc.

Hardware Architecture Example

Figure 1:
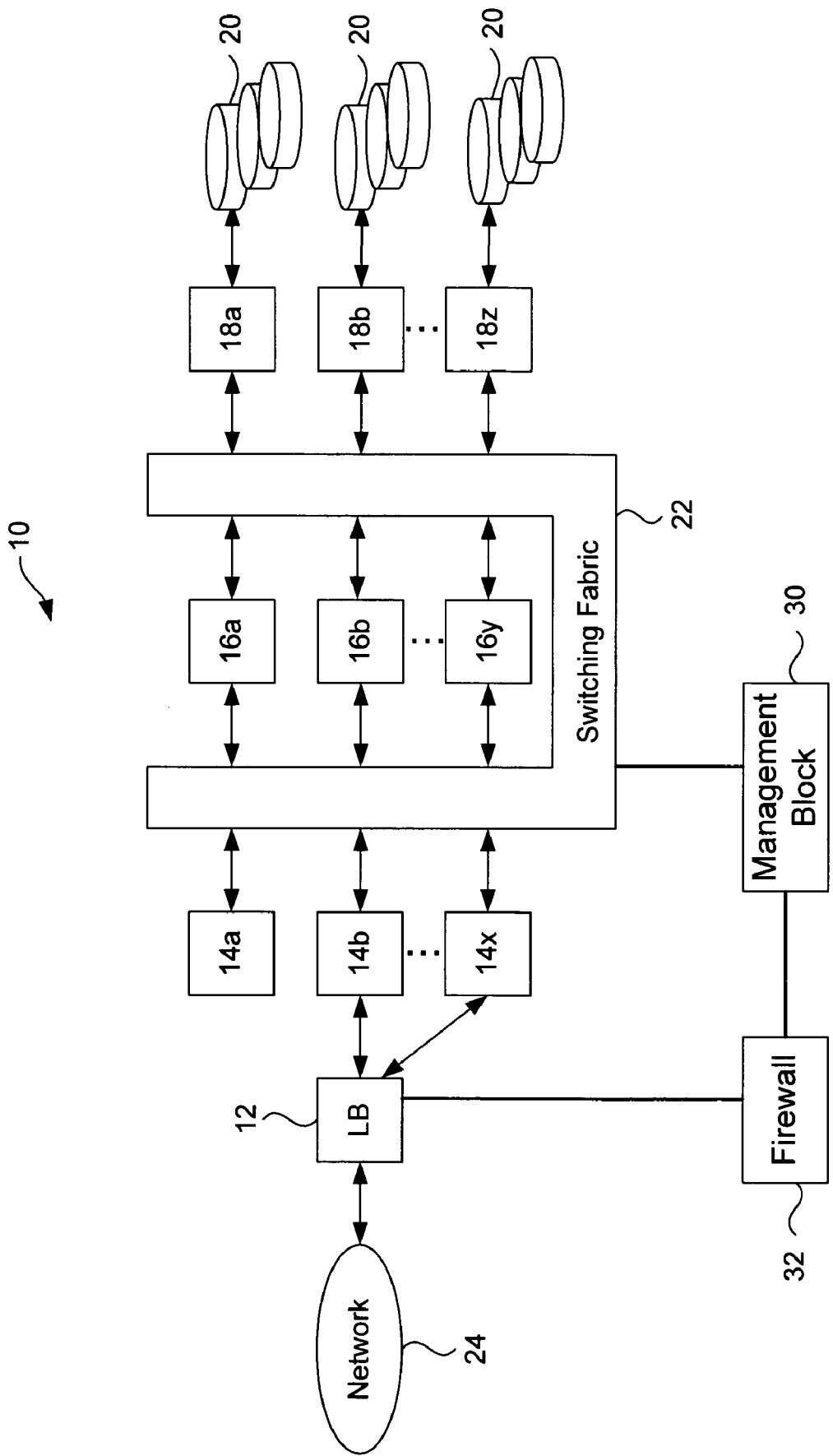
FIG. 1 is a block diagram of a NAS system having a scalable architecture according to the present invention.

FIG. 1 presents a block diagram of a NAS system having a scalable architecture according to certain embodiments of the present invention. The NAS system 10 includes a load balancer 12, one or more termination nodes 14a through 14x, one or more file server nodes 16a through 16y, one or more disk controller nodes 18a through 18z, and a plurality of disks 20. In a specific implementation, some or all of the nodes 14, 16, and 18 are single processors. A switching fabric 22 is provided to interconnect the termination nodes 14a through 14x, the file server nodes 16a through 16y, and the disk controller nodes 18a though 18z. Generally, this permits any termination node 14 to communicate with any file server node 16. Similarly, any file server node may communicate with any disk controller node. For convenience, the protocol termination nodes 14 are sometimes referred to herein as "A blocks." Similarly, the file server nodes 16 are referred to as "B blocks" and the disk controller nodes 18 are referred to as "C blocks."

The switching fabric 22 may communicate using a proprietary or standard protocol such as high-speed Ethernet or any other suitable layer 2 protocol. Further, the hardware resources comprising the switching fabric can be sized as necessary to scale the file system. For example, fabric 22 may comprise one or more cards on a single switch and/or one or more separate switches.

The disk controller nodes 18a etc. may communicate with the disks 20 via any suitable protocol such as Fibre Channel and/or SCSI. For example, the disk controller nodes may request read and write access using a SCSI over Fibre Channel protocol. In certain embodiments, one or more Storage Array system (not shown) could be used with the disk controller nodes 18a through 18z and the disks 20. The NAS system is connected to a network 24 through a standard network interconnect. The network 24 can be any type of computing network including a variety of servers and users running various operating systems such as Windows, Unix, Linux, or a combination thereof.

The load balancer 12 receives requests to access files stored on the NAS system 10 from users on the network 24. The main function performed by the load balancer 12 is to balance the number of active connections among the one or more termination nodes 14a through 14x. In other words, the load balancer 12 dynamically assigns user connections so that no one termination node 14 becomes a "bottleneck" due to handling too many connections. This makes the architecture more scalable. In a system 10 having three termination nodes 14 for example, if the first, second and third termination nodes 14 are handling seven (7), eleven (11), and three (3) connections respectively, then the load balancer 12 will forward the next connections to the third termination node 14 since it is handling the fewest number of connections. The load balancer 12 also redistributes connections among remaining termination nodes 14 in the event one fails or in the event a new termination node 14 is added to the NAS system 10. The load balancer 12 can employ various metrics to distribute the load among the termination nodes 14. For example, the load balancer 12 can distribute the load based on CPU utilization, memory utilization and the number of connections, or any combination thereof.

In the example of FIG. 1, a firewall 32 is provided at the network interface of NAS system 10, in this case at the load balancer. The system also includes a "management block" 30 in communication with the termination nodes, the file server nodes, and the disk controller nodes over switch fabric 22. Management block 30 configures the file system on the termination and file server nodes 14 and 16. Typically, a user (administrator) will provide the relevant information for configuring a hierarchy of files and trees. Management block 30 may also communicate with a domain controller (not shown), which may be employed to authenticate users based on, e.g., username and password.

In some embodiments, to improve scalability, system 10 may include multiple instances of the Management block 30. In certain embodiments, the functions of management block are implemented elsewhere in the architecture, e.g., in a file server node 16. In such cases, it may be unnecessary to employ a separate management entity, apart from the management process running on one of the other nodes in the server.

SMB Messages—Introduction

As indicated, algorithms run on blocks 14, 16 and 18 to process SMB messages. For context, a typical flow of SMB messages is as follows:

SMB_COM_NEGOTIATE
SMB_COM_SESSION_SETUP
SMB_COM_TREE_CONNECT
SMB_COM_OPEN
SMB_COM_READ
SMB_COM_CLOSE
SMB_COM_TREE_DISCONNECT

The first message sent by the host (client) to the file server is the negotiate message (SMB_COM_NEGOTIATE). The negotiate phase determines which version or release of SMB (SMB "dialect" in CIFS parlance) the host and file server will use during communicate. The negotiate messages identify which dialects are supported by the host and file server. After exchange of these messages, the host and file server automatically determine which dialect they will use for a connection. Specifically, the client's message includes a list of SMB dialects supported by the client. The server's response indicates which SMB dialect should be used.

SMB provides the concept of a "session," in which a server authenticates a user for purposes of accessing files until the session ends. The SMB_COM_SESSION_SETUP message transmits the user's name and credentials to the server for verification. The server will then try to authenticate this information. Successful server response provides a Uid (User ID) field set in SMB header used for subsequent SMBs on behalf of this user. Authentication by the server allows the user to communicate with the server and access files as appropriate until the session is closed. The Uid is fixed in the file server and is associated with certain user parameters such as privileges, etc. Each time the user sets up a new session, the file server provides the same Uid.

SMB provides the concept of a "connection," during which the user/client gains access to a particular tree in the file system. The client command SMB_COM_TREE_CONNECT indicates to the file server that the user now wants to access a "share." Specifically, the command transmits the name of the disk share the client wants to access. In SMB parlance, a share is a tree within a hierarchical logical file system. During the connect operation, a tree ID (Tid) is specified by the file server. Thus, a successful server response has Tid field set in SMB header used for subsequent SMBs referring to this resource.

SMB also provides an "open" command, which specifies the name of the file wants to open. A successful server response includes a file ID (Fid) the client should supply for subsequent operations on this file. The file ID is provided with respect to a tree ID; the file resides within a tree.

Once a file has been opened, the client may provide an SMB_COM_READ command specifying the Tid, Fid, file offset, and number of bytes to read. A successful server response includes the requested file data. There may also be a corresponding write operation using the standard SMB command.

The client may then close the file represented by Tid and Fid by sending an SMB_COM_CLOSE message. The file server responds with a success code. Finally, the client sends an SMB_COM_TREE_DISCONNECT message in which the client effectively disconnects from resource represented by Tid.

It is possible to batch SMB messages such as SESSION_SETUP and TREE_CONNECT. More generally, multiple parameter and data bocks may be strung together behind a single SMB header when using a special type of SMB message known as an ANDX message. Various standard ANDX messages are presented below.

Configuring the File System onto File Server Nodes

Figure 2A:
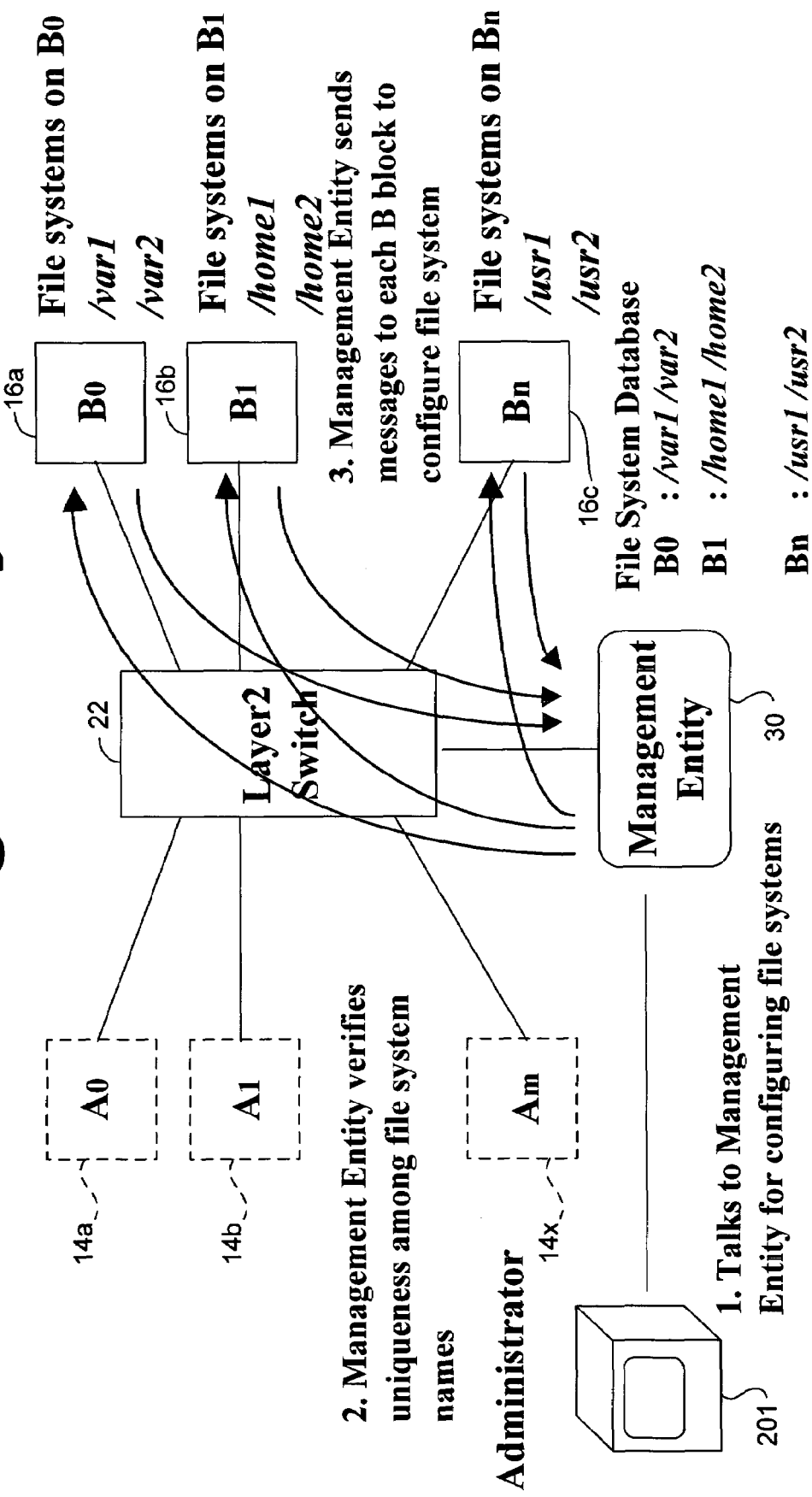
FIG. 2A is a block diagram illustrating how a file system is configured using a management block, one or more file server nodes and an administrator in accordance with an embodiment of this invention.
Figure 2B:
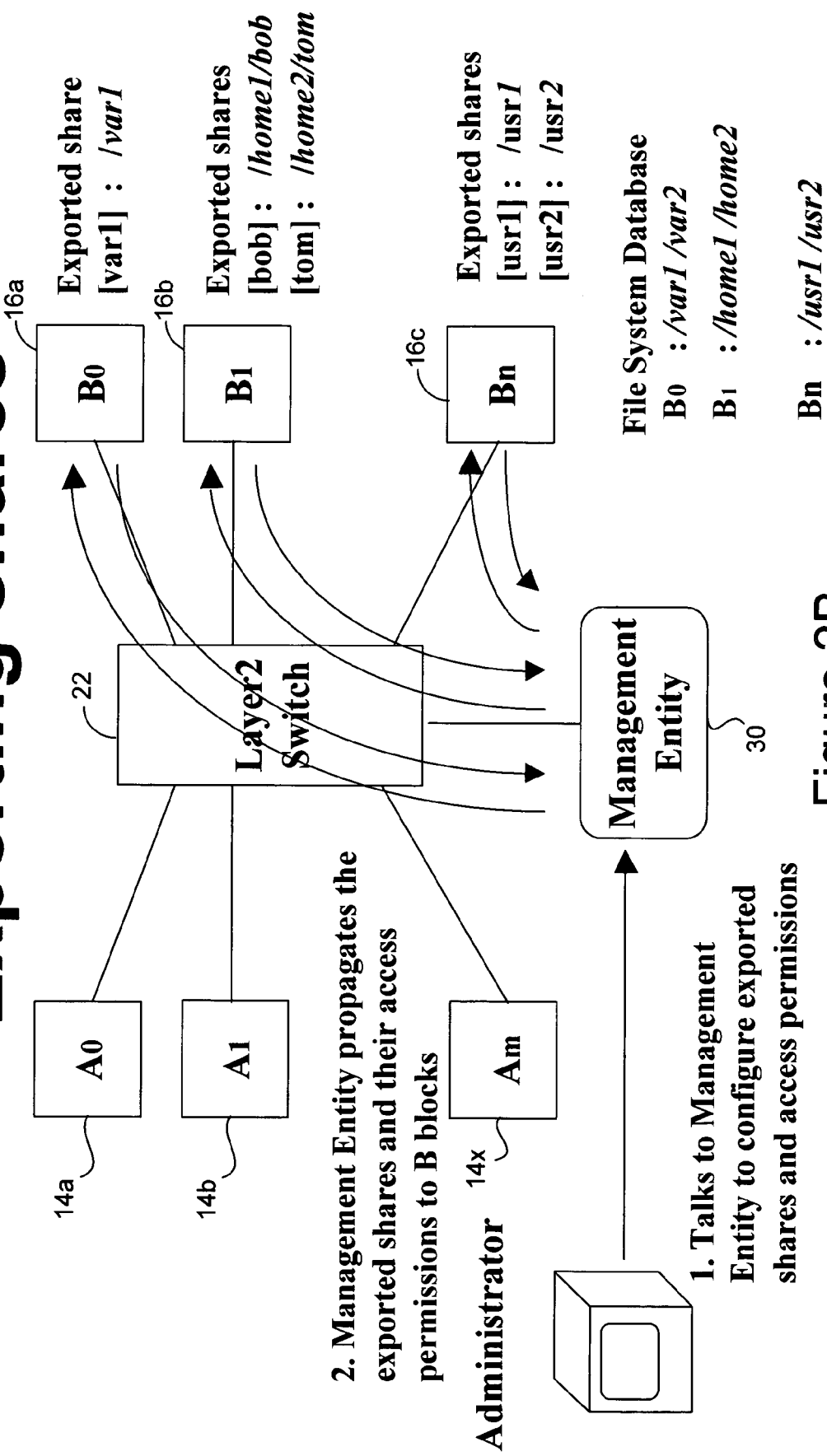
FIG. 2B is a block diagram illustrating how shares are exported to a file system created in FIG. 2A in accordance with an embodiment of this invention.

The file system must be created and populated with files on the file server. In certain embodiments, as depicted in FIGS. 2A and 2B, this may be accomplished by an administrator 201 using the Management Block 30 and in conjunction with the file server nodes 16. Initially, as depicted in FIG. 2A, the administrator 201 communicates her file system arrangement (files and shares) to Management block 30, which then verifies that the administrator's file and share names are unique among file system names. The Management block may accomplish this by checking an internal representation of the current file directory or by communicating with other nodes in the file system. The administrator and Management block may communicate by any appropriate means, e.g., a Java application.

Assuming that the Management block determines that the administrator's file system(s) are acceptable, it determines which file server nodes 16 should be responsible for which new shares and configures these nodes as appropriate. In the depicted example, node 16a is made responsible for the trees /var1 and /var2, node 16b is made responsible for trees /home1 and /home2, and node 16c is made responsible for the trees /usr1 and /usr2. Management block 30 also maintains its own internal database representing the entire file system, including which file server nodes 16 are responsible for which shares. The process of exporting shares is depicted in FIG. 2B.

During creation and configuring of the file system, as by for example the procedure described above in the context of FIGS. 2A and 2B, various CIFS entities are created. These include User ids (Uid), Tree ids (Tid), and File ids (Fid). The Uids are fixed and identify users with associated file access privileges, authentication information, etc. The User ID is sometimes called "virtual" because it does not need to be the actual UserID as understood by the client or server OS. The Tids and Fids identify specific shares and files within the shares as configured on the file system. As explained more fully elsewhere herein, provision of a Tid indicates a file sharing connection to a shared resource. In a specific example, the file system permits 64 K Tids per client and 64 K Fids per client, with each user getting a different Fid for the same file.

Authentication and Generation of Identifiers

After the file system has been configured and shares are exported, users can access the files using the CIFS protocol and associated SMB messages. As indicated, after an initial negotiation to determine CIFS dialect, a session is created in which the user is authenticated. When a session is established, the file system issues the user a Uid, to be used in subsequent communications. This represents a successful authentication. A second phase of authentication occurs during the TREE_CONNECT. In many cases, the file system is configured such that authentication is required to access particular shares. For example, a given user (as known to the file system by a unique Uid) may have privileges to access the shares /var1 and /var2 but not /home1 and /home2. In certain embodiments, the share level authentication requires a combination a particular Uid and password to access particular shares.

There are multiple approaches to handling session and connection requests from clients using a scalable architecture such as the one presented in FIG. 1. In a first approach, the termination nodes (A blocks) and file server nodes (B blocks) share responsibility. Initially, one of the protocol termination nodes 14a, 14b, . . . in FIG. 1—determined by load balancing—is made responsible for the session. The responsible A block maintains a list of attributes for a particular "virtual circuit" for a session until a TREE_CONNECT request comes in. Once the TREE_CONNECT request comes in, the A block performs a match on the disk share name and finds out the appropriate B block (one of the file server nodes 16a, 16b, . . . responsible for the requested share). Then the A block forwards all the session information to that B block. From this point forward it is the responsibility of the B block to maintain state associated with the session.

In a second embodiment, the file server nodes (B blocks) handle both sessions and connections. In this embodiment, the A block forwards the initial user request to any B block. The receiving B block maintains a list of attributes for a particular virtual circuit for a session. Once the TREE_CONNECT request comes in, the A block identifies the responsible B block and forwards the connect request.

In a third embodiment, the protocol termination node (A block) handles the session and obtains information from the file server nodes as necessary during the course of the session. Initially, the A Block generates a session key and responds to the NEGOTIATE message with an appropriate dialect. In response to the SESSION_SETUP message, the A block lets the Management process know about this new client. This is done in order to clean up any state in M or B block, which was there due to an earlier connection with that client. The A Block may also abort any existing virtual circuits still connected to the client in order to handle client reboots. In some embodiments, the A block forwards the SMB SESSION_SETUP request to the Management process. The management process authenticates the user and generates the Uid, which is then sent back to the A block. In other embodiments, the A block forwards the request directly to a domain controller for authentication.

Ultimately, the Uid has to be communicated to the correct B block (file server node) along with other session information. But at the SESSION_SETUP stage the server does not know which B blocks will be handling the TREE_CONNECT requests. So, the B block may be provided with a mechanism for querying the Management process for this information. A list of Uids can be cached on the B blocks for future use.

In certain embodiments, the A block may maintain a list of authenticated users (Uids) for each client. Later, the authentication of further requests (for example, TREE_CONNECT, READ_FILE) can be done on the A block before forwarding the request to the B blocks. This ensures that unauthenticated users from a client do not gain access to the data.

Note that one session can have multiple TREE_CONNECT requests spanning shares across multiple file server blocks. By giving a termination node responsibility for the session, the third embodiment easily handles this scenario. The following provides an example of this scenario.

NEGOTIATE
SESSION_SETUP
TREE_CONNECT /usr/local // goes to B1
TREE_DISCONNECT
TREE_CONNECT /usr/src // goes to B2
TREE_DISCONNECT
SESSION_END This could, for example be used while moving a file from /usr/local/foo to /usr/src/bar.

A specific algorithm for generating Uid in response to an SMB_COM_SESSION_SETUP message will now be described in accordance with the third embodiment above. In this embodiment, a protocol termination node (one of nodes 14a, 14b, . . . in FIG. 1, determined by load balancing) receives the message from the client. This request may include the username and password for the client. The protocol termination node then provides a request for authentication to Management block 30. The Management block, in turn, may need to communicate with an external domain controller to authenticate the client using the username and password. If the Management block can authenticate the user based on the information provided, it will generate a Uid and return such to the client, via the protocol termination node, which provides the Uid as a response to the initial SETUP message from the client. As indicated the Uids are fixed per user, so that the same Uid will be returned each time the client comes back up to the system.

Figure 3A:
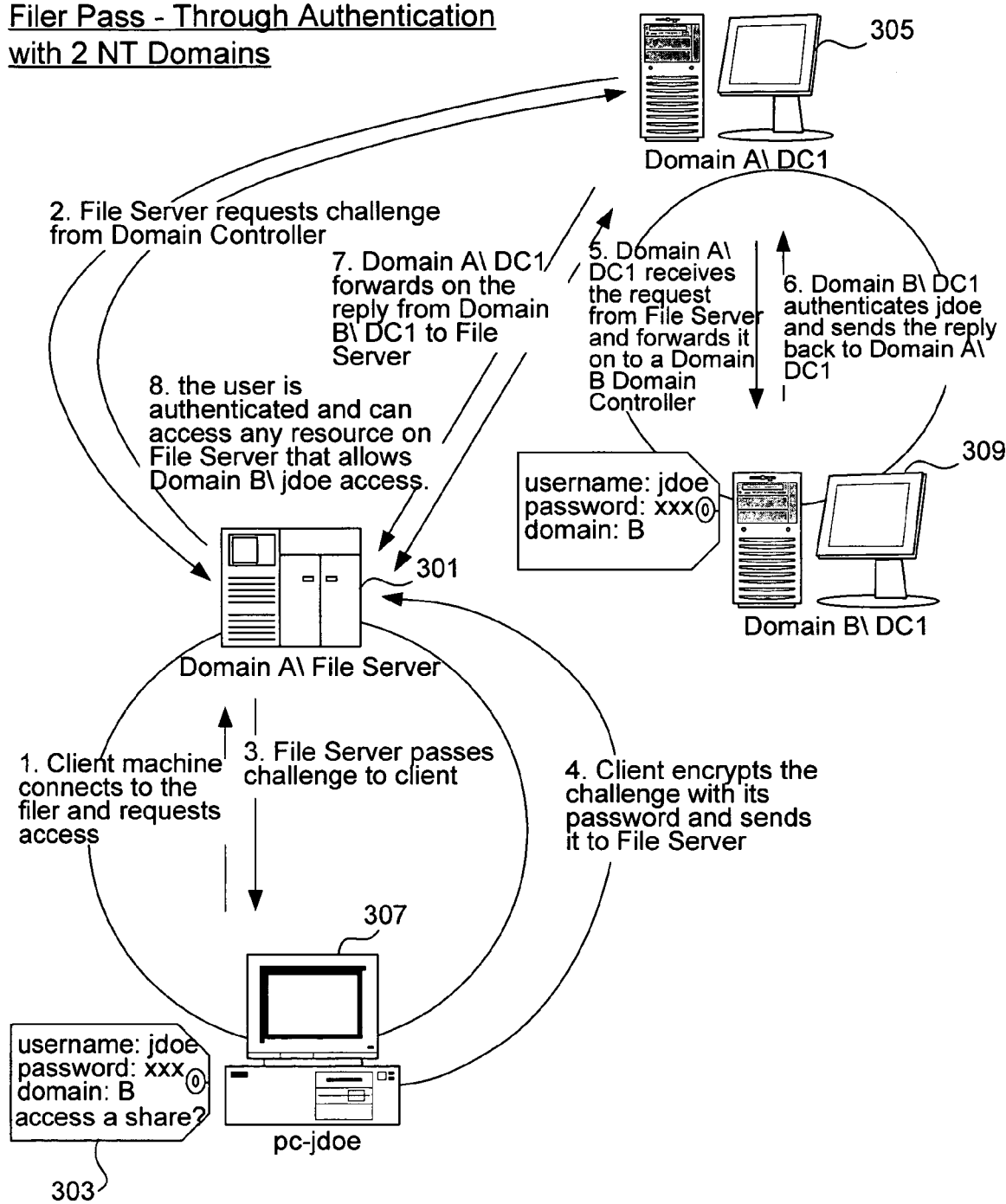
FIG. 3A is block diagram illustrating a pass-through authentication procedure employing 2 domains in accordance with an embodiment of this invention.
Figure 3B:
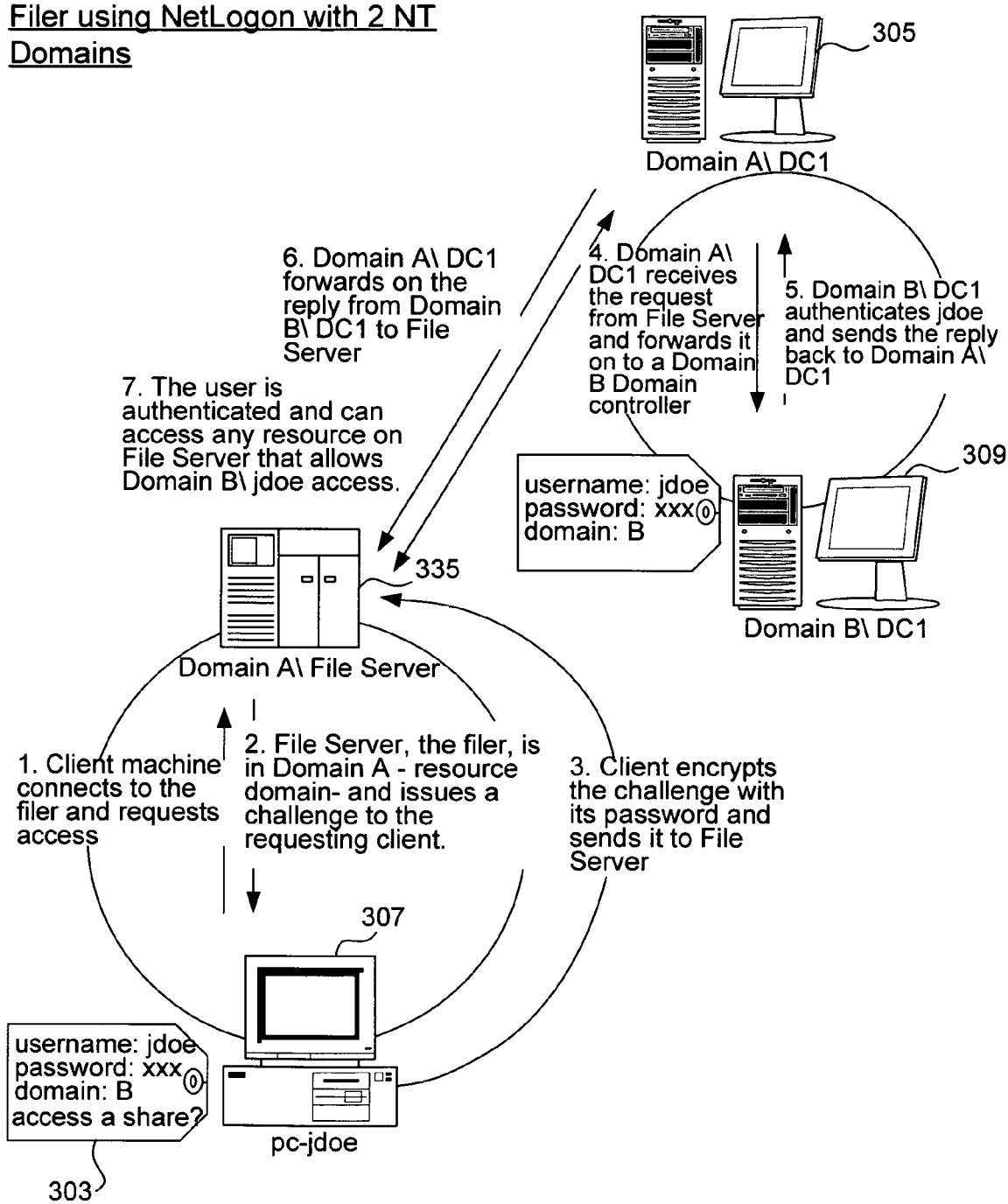
FIG. 3B is block diagram illustrating a net logon authentication procedure employing 2 domains in accordance with an embodiment of this invention.

Examples of user authentication procedures (SESSION_SETUP) involving external domain controllers are depicted in FIGS. 3A and 3B. FIG. 3A depicts a sequence of events is a "pass-through authentication" procedure. In this example, a NAS file server 301 provides storage in multiple domains, each associated with a separate domain controller. For example, certain shares on a given server might belong to domain A and other shares on the same server might belong to domain B. In this example, a user 303 who can be authenticated on domain B communicates over a network with file server 301, which by default employs a domain A domain controller 305 to authenticate users. In this scenario, pass-through authentication makes it possible for users to logon to the network and access resources from computers or domains in which they have no accounts.

In the specific example of FIG. 3A, user 303, through a client machine 307, initially connects to file server 301 and, after negotiation, requests access to one or more files stored thereon. By default, file server 301 communicates authentication requests to its domain controller 305. In this specific example, the authentication process employs an encrypted challenge. Therefore, in its communication with domain controller 305, file server 301 requests a challenge, which the domain controller returns. Thereafter, file server 301 passes the challenge to the client machine 307. The client machine then encrypts the challenge with its password and sends it back to the file server 301, which passes the encrypted challenge on to domain controller 305.

As mentioned, domain controller 305 is responsible for domain A, while user 303 is authenticated by domain B. Recognizing this, domain control 305, forwards the encrypted challenge and associated information from the user's access request to a second domain controller 309, responsible for authenticating users on domain B. Controller 309 then authenticates the user 303 using the challenge encrypted with the user's password and sends a reply back to the domain A domain controller 305. From there, controller 305 forwards the reply to file server 301. At this point, user 303 is authenticated and can access any resource on the file system that allows the domain B user to have access. Further, file system 301 will return a Uid to client 307 for use in this and subsequent sessions.

FIG. 3B presents another approach to authentication, which is referred to as "NetLogon." NAS systems having a machine account in the NT Domain can employ NetLogon for authentication. This means that when the file server boots, it contacts a domain controller to authenticate itself, thus becoming part of the domain itself. This allows the authentication of a user and her password to be handled via a secure channel between the file system and the domain controller. NetLogon allows the file server to issue its own challenge as shown in FIG. 3B. As shown in FIG. 3A, servers using pass-through authentication must obtain a challenge from the domain controller rather than generating their own. This means that a file system using NetLogon removes the possibility of man-in-the-middle attacks making authentication more secure. Further, since the file system generates its own challenge it also cuts down on the traffic between the Domain Controller and the file system, thus speeding up the authentication process.

NetLogon returns information to the file system needed for file and directory level ACLs. NetLogon provides general information about the user: their SID, NT Group membership, logon restrictions—all the information on that user which is stored in the NT Domain SAM. The full list of returned user information includes Username, full name, description, SID, NT group memberships, Logon hours, workstations the user is allowed to use, account expiration date, home directory, login script, profile, account type In the specific example depicted in FIG. 3B, user 303 again requests authentication when communicating over a network via the client machine 307. In this case, the NAS file server is configured to implement a NetLogon device. Such device is depicted in FIG. 3B as filer 335. As with file server 301 in FIG. 3A, file server 335 resides in domain A and therefore by default communicates with the domain A domain controller. Also in the example of FIG. 3B, as with the example of FIG. 3A, the user 303 must be authenticated in a different domain, domain B.

Returning to FIG. 3B, the client machine 307 initially connects to the file server 335 and requests access to files. Thereafter, server 335 issues a challenge to the requesting client directly. The client then encrypts the challenge with its password and sends it back to device 335. The device thereafter forwards the encrypted challenge to its default domain controller 305.

Domain controllers 305 and 309 perform their remaining responsibilities in the same manner as described with respect to the pass-through authentication procedure depicted in FIG. 3A. Specifically, domain controller 305 recognizes that domain controller 309 is responsible for authenticating user 303 and forwards the request on to controller 309. Domain controller 309 then authenticates user 303 and sends a reply back to domain controller 305, which in turn forwards the reply to NAS device 335. At this point, the user is authenticated and can use any resource on device 305 that allows domain B/user 303 access. Device 335 also issues a Uid to client 307 for use in subsequent communications during the session.

After user authentication, a typical SMB sequence involves connecting to a particular share (SMB_COM_TREE_CONNECT message). The tree connect SMB message from the client is received at a protocol termination node 14 (e.g., a specific A block chosen by the load balancer). From this point, the connect can be processed in various ways depending on implementation.

Figure 4A:
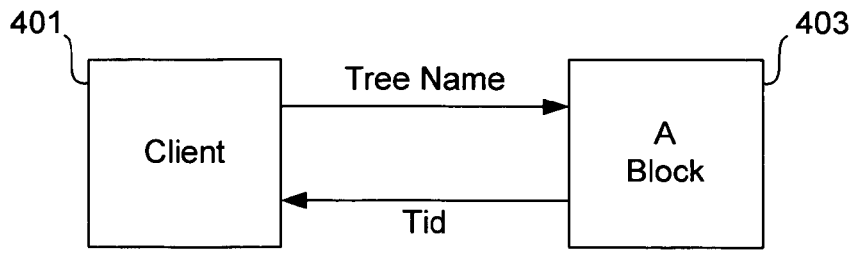
FIG. 4A is a diagram depicting the interaction of a client and a termination node during an SMB connect procedure.

In certain embodiments, the termination nodes maintain a mapping of the share names to particular unique Tids. Thus, a termination node 14 handling the connect request replies with the Tid for the share to be accessed. Thereafter for all requests to access the share, the client will communicate using the Tid. This is depicted in FIG. 4A, which shows a client 401 connecting with a protocol termination node 403.

As mentioned above, the Tid is the CIFS tree identifier assigned on a per client basis. This is how the client and protocol termination nodes understand which share is to be accessed. In establishing the connection, the client does not immediately know the Tid. It only knows the share name. Therefore, the protocol termination node with which the client is communicating provides the Tid to the client.

After the tree connect operation, the client may submit an SMB OPEN message to its protocol termination node. This message includes the Tid learned by the client during the CONNECT procedure. The Tid is then used by the termination node to determine which file server node is responsible for the requested share. In this regard, the termination nodes may maintain a mapping of the share Tids to particular file server nodes 16 that are responsible for such shares. For example, as presented in FIG. 2A, file server node 16b is responsible for shares /home1 and /home2.

Figure 4B:
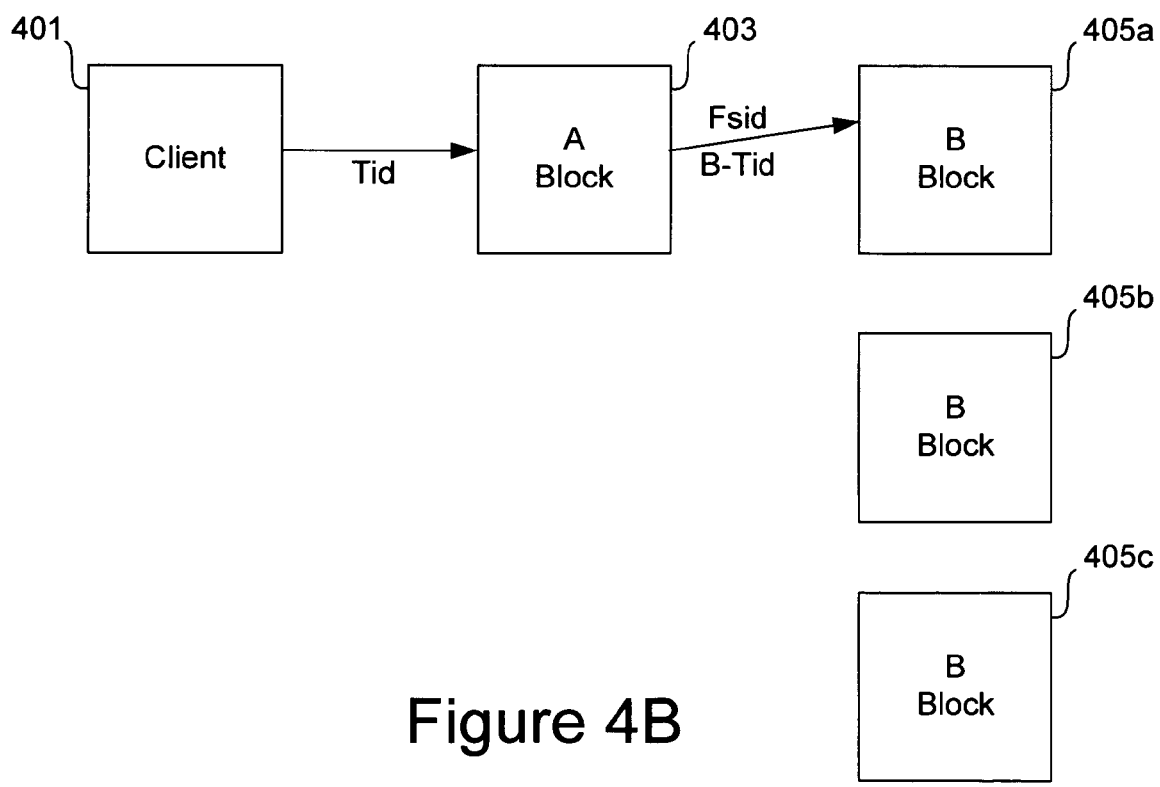
FIG. 4B is a diagram depicting the interaction of a client, a termination node, and the file server nodes during an SMB open procedure.

The file server nodes (B blocks) each have their own IDs for the shares they maintain. These are referred to as the "B_Tids." The file server nodes also maintain their own file system IDs ("Fsids"), which identify the file systems within which the shares reside. So access requests to a file system node should reference the B_Tid and Fsid for the desired share in this embodiment. FIG. 4B depicts this process. Client 401 communicates an SMB OPEN message to the termination node 403, which in turn uses the Tid from the message to determine which file server node 405 is responsible for the share. Node 403 also determines whether the Fsid and the B_Tid for the share and communicates these to the file server 405 responsible for the share to be accessed. In FIG. 4B, node 405a is responsible for the requested share.

Figure 5:
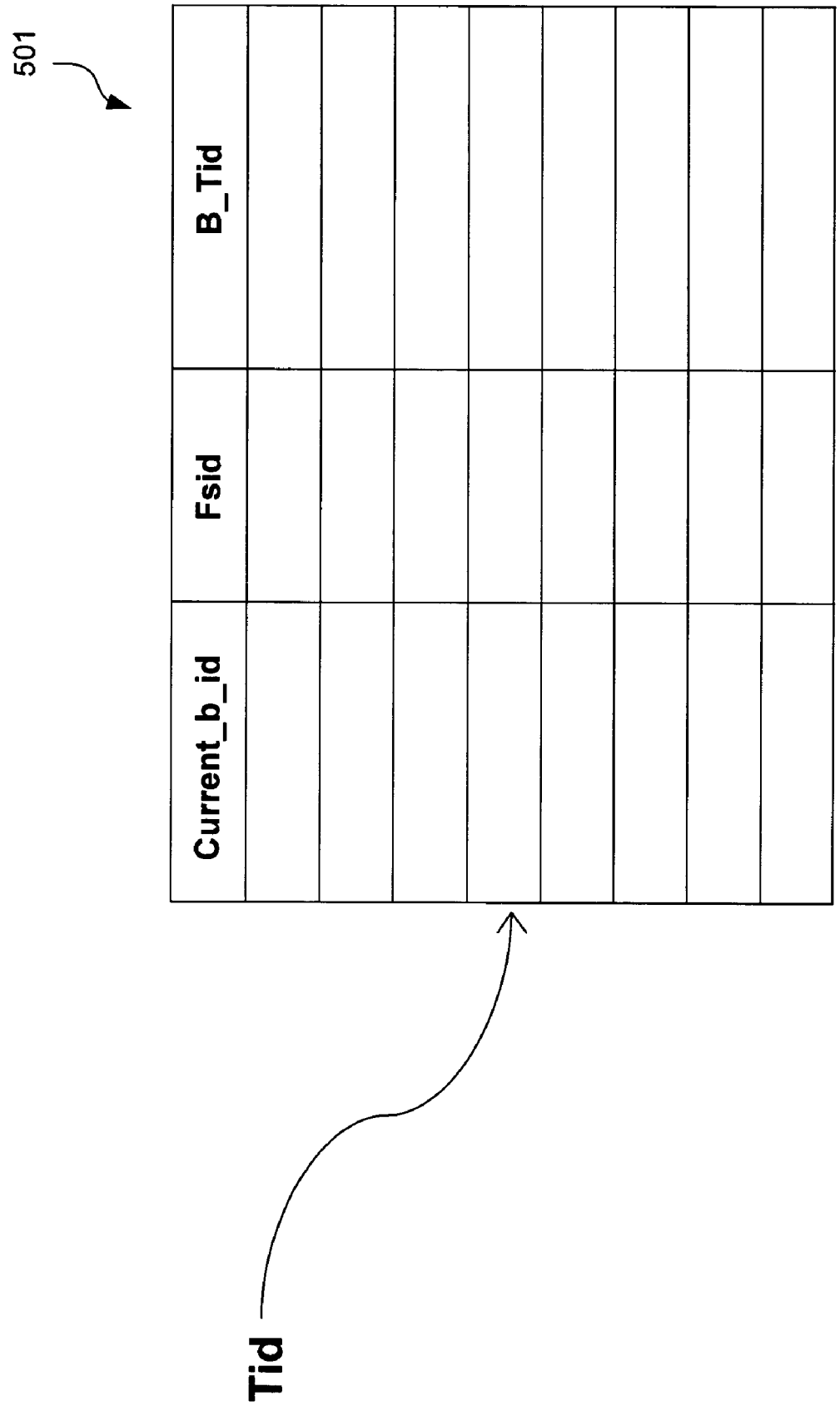
FIG. 5 is an array (provided on a per client basis) for accessing shares on specific file server nodes responsible for shares.

In a specific embodiment, each termination node 14 (A block) maintains a sparse array for each client. The Tid are the indexes into the array. See FIG. 5. As shown, for each Tid, an array 501 provides the Current_b_id (the id of the file server node currently responsible for the share), the Fsid, and B_Tid.

In certain embodiments, the A blocks are configured to handle batch requests (relevant messages may end in _ ANDX). In this regard, an A block receiving a batch request parses the TREE_CONNECT part of the batch request and then sends the whole batch request to the appropriate B block.

In certain embodiments, the termination node forwards the TREE_CONNECT request to the Management process (e.g., a process running on Management block 30). The Management process authenticates the request and looks up the file server node id corresponding to the share name. It then forwards the request to that file server block, which generates a Tree identifier (B_TiD).

Figure 6:
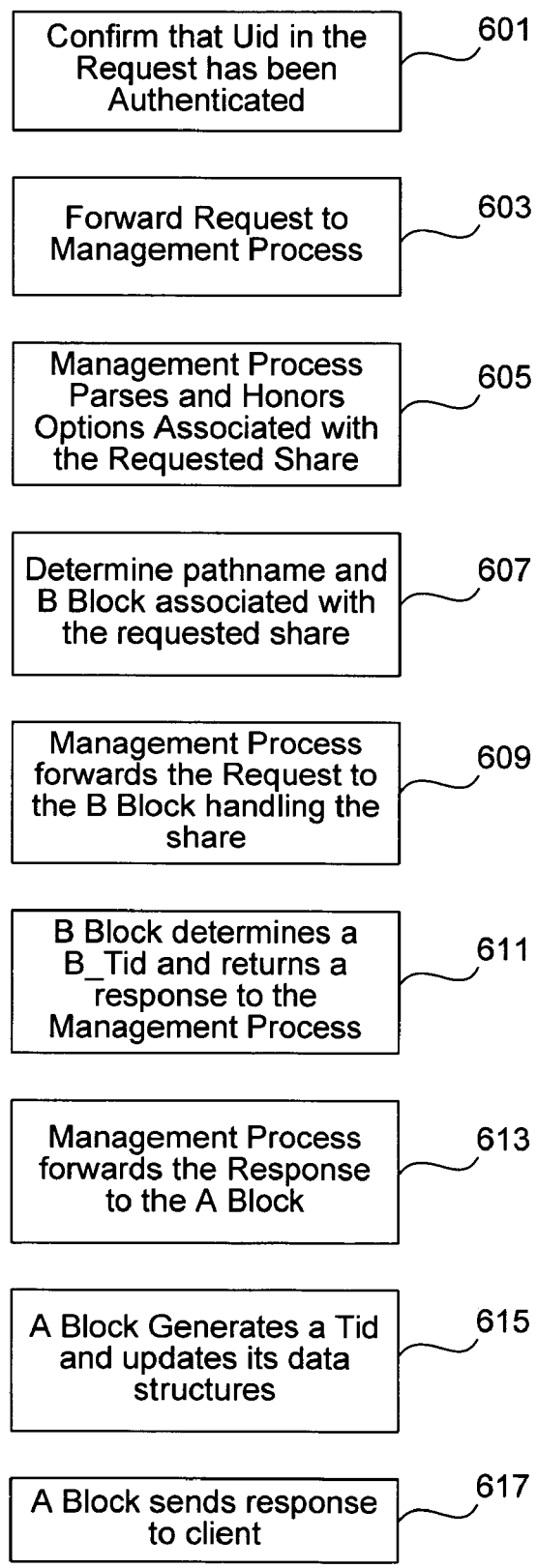
FIG. 6 is a flow chart depicting one specific implementation for handling tree connect requests from clients.

FIG. 6 is a flow chart depicting a sequence of operations for a TREE_CONNECT that may be employed (in whole or part) by the responsible A block (termination node) the B block (file server node) in conjunction with the management process. The process begins at 601 with the A block receiving a TREE_CONNECT SMB message and checking that the user (Uid) has been authenticated on the client from which the request is being received. Once this check is passed, the A block forwards the request to the Management process. See block 603. If the check fails, the A block responds back to the client with an error message. Note that in early dialects of SMB (prior to LANMAN1.0), it is possible to authenticate a user at the time of the TREE_CONNECT message. Thus, if the negotiated dialect is prior to LANMAN1.0 and the client has not sent a successful SMB_COM_SESSION_SETUP request when the tree connect arrives, the Management process may authenticate the user's access to the share with the provided password.

Returning to FIG. 6, the Management process next parses and honors the various options associated with the share being requested. See block 605. The management block also authenticates the user's access to the share. In this regard, a password may be required to access particular shares. Also, certain Uids may have privileges for some shares but not others. The options that apply to a share may come from the configuration information associated with this share as well as from other sources.

Next, the Management process uses the share name to determine the pathname and B block associated with the requested share. See block 607. Note that the share name need not be the same as a pathname. There may be a mapping between the share name and the pathname. The pathname could be something that is algorithmically generated as well. An example of this is the "homes" share, which is a simple placeholder for connecting to users' home directories. If no match is found with any of the exported shares, the share name is assumed to be that of a user and the /etc/passwd file is scanned to locate the user and his corresponding home directory. If this is found, the name of the exported share is changed to that of the username and the path to the user's home directory is the one the connection is made to. The user's home directory can also be specified via a path option specified with the "homes" share.

Next in the method, the Management process forwards the request to the B block handling that share, as indicated at block 609. The B block performs file access checking, determines a B_Tid and returns a response to the Management process as indicated at block 611. In an alternative embodiment, the B block returns the response to the A Block directly. As indicated at blocks 613 and 615, the Management process next forwards the response to the A block and the A block generates a Tid and updates its data structures. Finally, the responsible A block sends a response including the Tid to the client. See block 617.

There are other possibilities for generating the necessary IDs and mappings for the TREE_CONNECT in an architecture comprising termination nodes and file server nodes. Some of these options are presented below.

Processing Other SMB Messages

Other SMB messages may be treated in various ways employing a scalable architecture as described herein. Some of these messages and processing embodiments are described below.

NT_CREATE_ANDX: Create or Open File—This command is used to create or open a file or a directory. Processing may be accomplished as follows.
1. The A block checks that the user (Uid) has been authenticated on the client from which the request is being received.
2. The A block checks that the Tid is valid for that particular client.
3. Once these checks are passed, the A block forwards the request to the appropriate B block, based on the TiD contained in request. If any check fails, A responds back to the client with an error message.
4. The A block also replaces the Tid with the B_Tid.
5. The B block then identifies the actual file associated with the operation via the Fid carried in the request.
6. The B block makes sure that the user has appropriate permissions for that Fid. For example, if the user belongs to the same group as file owner. In order to do this, the B block can look up its cache and/or query the Management process for attributes related to the Uid. If the user does not have appropriate permission then an error code is returned to the client.
7. Subsequent processing is done as appropriate to allow the user to create or open the file identified by the Fid in the request. In one implementation, this processing is accomplished using public domain software for handling CIFS messages such as the Samba/Veritas code provided for this purpose.

NT_TRANSACT_CREATE: Create or Open File with EAs or SD

This command is used to create or open a file or a directory, when EAs (extended attributes) or an SD (security descriptor) must be applied to the file. Processing may be accomplished as follows.
1. The A block checks that the user (Uid) has been authenticated on the client from which the request is being received.
2. The A block checks that the Tid is valid for that particular client.
3. Once these checks are passed, the A block forwards the request to the appropriate B block, based on the TiD contained in request. If any check fails, A responds back to the client with an error message.
4. The A block also replaces the Tid with the B_Tid.
5. The B block then identifies the actual file associated with the operation via the Fid carried in the request.
6. The B block makes sure that the user has appropriate permissions for that Fid. For example, if the user belongs to the same group as file owner. In order to do this, the B block can look up its cache and/or query the management process for attributes related to the Uid. If the user does not have appropriate permission then an error code is returned to the client.
7. Subsequent processing is done as appropriate to allow the user to create the file identified by the Fid in the request. In one implementation, this processing is accomplished using public domain software for handling CIFS messages such as the Samba/Veritas code provided for this purpose.

CREATE_TEMPORARY: Create Temporary File

Processing may be accomplished as follows.
1. The A block checks that the user (Uid) has been authenticated on the client from which the request is being received.
2. The A block checks that the Tid is valid for that particular client.

3. Once these checks are passed, the A block forwards the request to the appropriate B block, based on the Tid contained in request. If any check fails, A responds back to the client with an error message.
4. The A block also replaces the Tid with the B_Tid.
5. The B block then identifies the actual file associated with the operation via the Fid carried in the request.
6. The B block makes sure that the user has appropriate permissions for that Fid. For example, if the user belongs to the same group as file owner. In order to do this, the B block can look up its cache and/or query the Management process for attributes related to the Uid. If the user does not have appropriate permission then an error code is returned to the client.
7. Subsequent processing is done as appropriate to allow the user to create a temporary file identified by the Fid in the request. In one implementation, this processing is accomplished using public domain software for handling CIFS messages such as the Samba/Veritas code provided for this purpose.

READ_ANDX: Read Bytes

Processing may be accomplished as follows.
1. The A block checks that the user (Uid) has been authenticated on the client from which the request is being received.
2. The A block checks that the Tid is valid for that particular client.
3. Once these checks are passed, the A block forwards the request to the appropriate B block, based on the Tid contained in request. If any check fails, A responds back to the client with an error message.
4. The A block also replaces the Tid with the B_Tid.
5. The B block then identifies the actual file associated with the operation via the Fid carried in the request.
6. The B block makes sure that the user has appropriate permissions for that Fid. For example, if the user belongs to the same group as file owner. In order to do this, the B block can look up its cache and/or query the Management process for attributes related to the Uid. If the user does not have appropriate permission then an error code is returned to the client.
7. Subsequent processing is done as appropriate to allow the user to read the file identified by the Fid in the request. In one implementation, this processing is accomplished using public domain software for handling CIFS messages such as the Samba/Veritas code provided for this purpose.

WRITE_ANDX: Write Bytes to file or resource

Processing may be accomplished as follows.
1. The A block checks that the user (Uid) has been authenticated on the client from which the request is being received.
2. The A block checks that the Tid is valid for that particular client.
3. Once these checks are passed, the A block forwards the request to the appropriate B block, based on the Tid contained in request. If any check fails, A responds back to the client with an error message.
4. The A block also replaces the Tid with the B_Tid.
5. The B block then identifies the actual file associated with the operation via the Fid carried in the request.
6. The B block makes sure that the user has appropriate permissions for that Fid. For example, if the user belongs to the same group as file owner. In order to do this, the B block can look up its cache and/or query the Management process for attributes related to the Uid. If the user does not have appropriate permission then an error code is returned to the client.
7. Subsequent processing is done as appropriate to allow the user to write to the file identified by the Fid in the request. In one implementation, this processing is accomplished using public domain software for handling CIFS messages such as the Samba/Veritas code provided for this purpose.

SEEK: Seek in File

The seek message is sent to set the current file pointer for Fid. The SEEK message allows a user to maintain a specific location in the file for maintaining state. Processing of a SEEK message may be accomplished as follows.
1. The A block checks that the user (Uid) has been authenticated on the client from which the request is being received.
2. The A block checks that the Tid is valid for that particular client.
3. Once these checks are passed, the A block forwards the request to the appropriate B block, based on the Tid contained in request. If any check fails, A responds back to the client with an error message.
4. The A block also replaces the Tid with the B_Tid.
5. The B block then identifies the actual file associated with the operation via the Fid carried in the request.
6. The B block makes sure that the user has appropriate permissions for that Fid.
7. Subsequent processing is done as appropriate to allow the user to seek the file identified by the Fid in the request. In one implementation, this processing is accomplished using public domain software for handling CIFS messages such as the Samba/Veritas code provided for this purpose.

FLUSH: Flush File

Sometimes a write operation does not go to the hard disk. The operating system may simply cache it on the RAM and service access requests from the RAM. The flush operation ensures that the data is actually written on the hard disk.

The flush SMB message is sent to ensure all data and allocation information for the corresponding file has been written to stable storage. When the Fid has a value −1 (hex FFFF) the server performs a flush for all file handles associated with the client and Pid. The response is not sent until the writes are complete. Processing of a FLUSH message may be accomplished as follows.
1. The A block checks that the user (Uid) has been authenticated on the client from which the request is being received.
2. The A block checks that the Tid is valid for that particular client.
3. Once these checks are passed, the A block forwards the request to the appropriate B block, based on the Tid contained in request. If any check fails, A responds back to the client with an error message.
4. The A block also replaces the Tid with the B_Tid.
5. The B block then identifies the actual file associated with the operation via the Fid carried in the request.
6. The B block makes sure that the user has appropriate permissions for that Fid.
7. Subsequent processing is done as appropriate to allow the user to flush the file identified by the Fid in the request. In one implementation, this processing is accomplished using public domain software for handling CIFS messages such as the Samba/Veritas code provided for this purpose.

RENAME: Rename File

The rename file message is sent to change the name of a file.

Processing of a RENAME message may be accomplished as follows.

1. The A block checks that the user (Uid) has been authenticated on the client from which the request is being received.
2. The A block checks that the Tid is valid for that particular client.
3. Once these checks are passed, the A block forwards the request to the appropriate B block, based on the Tid contained in request. If any check fails, A responds back to the client with an error message.
4. The A block also replaces the Tid with the B_Tid.
5. The B block then identifies the actual file associated with the operation via the Fid carried in the request.
6. The B block makes sure that the user has appropriate permissions for that Fid.
7. Subsequent processing is done as appropriate to allow the user to rename the file identified by the Fid in the request. In one implementation, this processing is accomplished using public domain software for handling CIFS messages such as the Samba/Veritas code provided for this purpose.

MOVE: Move a File

The source file is copied to the destination and the source is subsequently deleted. Processing of a MOVE message may be accomplished as follows.

1. The A block checks that the user (Uid) has been authenticated on the client from which the request is being received.
2. The A block checks that the Tid1 and Tid2 are valid for that particular client.
3. Once these checks are passed, the A block forwards the request to the appropriate B block, based on the Tids contained in request. If any check fails, A responds back to the client with an error message.
4. The A block also replaces the Tid1 with the B_Tid1 and Tid2 with B_Tid2. Furthermore A block adds information about the B_block_id that is currently handling requests for B_Tid2 (say, if the original B block handling those requests failed).
5. The B1 block then identifies the actual file associated with the operation via the FID carried in the request.
6. The B1 block also identifies the B2 block that is handling the B_Tid2 requests.
7. The B1 block makes sure that the user has appropriate permissions for that Fid. For example, if the user belongs to the same group as file owner. In order to do this, the B block can look up its cache and/or query the Management process for attributes related to the Uid. If the user does not have appropriate permission then an error code is returned to the client.
8. The B1 block communicates with the B2 block and completes the move operation. During this, the B2 block needs to ensure that the user has appropriate permissions for the operation.
9. If the operation is completely successful then B1 returns a positive response to A block, else it responds with an error.
10. It might happen that both the Tids are being handled by the same B block. In this case, no inter-B-block communication will occur.

COPY: Copy File

Processing of a COPY message may be accomplished as follows.

1. The A block checks that the user (Uid) has been authenticated on the client from which the request is being received.
2. The A block checks that the Tid1 and Tid2 are valid for that particular client.
3. Once these checks are passed, the A block forwards the request to the appropriate B block, based on the Tid1 contained in request. If any check fails, A responds back to the client with an error message.
4. The A block also replaces the Tid1 with the B_Tid1 and Tid2 with B_Tid2. Furthermore A block adds information about the B_block_id that is currently handling requests for B_Tid2 (say, if the original B block handling those requests failed).
5. The B1 block then identifies the actual file associated with the operation via the Fid carried in the request.
6. The B1 block also identifies the B2 block that is handling the B_Tid2 requests.
7. The B1 block makes sure that the user has appropriate permissions for that Fid. For example, if the user belongs to the same group as file owner. In order to do this, the B block can look up its cache and/or query the Management process for attributes related to the Uid. If the user does not have appropriate permission then an error code is returned to the client.
8. The B1 block communicates with the B2 block and completes the copy operation. During this, the B2 block needs to ensure that the user has appropriate permissions for the operation.
9. If the operation is completely successful then B1 returns a positive response to A block, else it responds with an error.
10. It might happen that both the Tids are being handled by the same B block. In this case, no inter-B-block communication takes place.

LOGOFF_ANDX: User Logoff

This SMB is the inverse of SMB_COM_SESSION_SETUP_ANDX. The user represented by Uid in the SMB header is logged off. The server closes all files currently open by this user, and invalidates any outstanding requests with this Uid.

In this operation, the A block may clean up the state associated with this session (a particular user logging in from a particular client). It also sends a broadcast/multicast message to B blocks to clean up any state for this session.

TREE_DISCONNECT: Tree Disconnect

This message informs the server that the client no longer wishes to access the resource connected to with a prior SMB_COM_TREE_CONNECT or SMB_COM_TREE_CONNECT_ANDX. The resource sharing connection identified by Tid in the SMB header is logically disconnected from the server. Tid is invalidated; it will not be recognized if used by the client for subsequent requests. All locks, open files, etc. created on behalf of Tid are released.

The CLOSE (Close File) and DELETE (Delete File) SMB messages are handled on the B block which controls the disk share.

State Maintenance

In various embodiments of the invention stateful operation is employed (e.g., certain B block failover modes). Various criteria may characterize the state to be maintained for CIFS—client information, user information, locks, Tid, A blocks associated with a client, etc. The particular types of state information, which entities are responsible for maintaining the state information, and where the state information is stored can all be set as appropriate for a given application. Certain categories of state information and exemplary embodiments are described in this section.

Client-transport specific state information includes the identities of clients connected, the identities of users connected on a specific client, etc. In certain embodiments, the list of clients connected is maintained on the A blocks and the list of users connected on a specific client (which may span multiple shares) is maintained on the B blocks. Also under the heading of client-transport state information is a "block_id" used to reach a particular client. This may be maintained on the B blocks and used when a B block wants to send notification to the clients to break an oplock. In certain embodiments, this information should be cleaned up if an A block fails.

User specific attributes such as NT groups, logon hours etc. may also be maintained as state information. These may be maintained in order to satisfy query requests from B blocks when a user attempts to connect to a tree share. For example, the B block can use this state information to implement ACLs etc. In certain embodiments, a management entity stores this state information and the B blocks cache it.

Share specific state information may also be maintained. For example, the root of the share (based on the Tid) may be maintained on B blocks. A list of users connected to the Tid may be maintained on a B block to validate Tid, say, for a READ request. Share options also may be maintained on the B block or on the management block and used for validating a TREE_CONNECT request. As indicated, a share to B block mapping may be maintained on the A Block and used during TREE_CONNECT. In a specific embodiment, a Tid to current B block mapping may be maintained on an A block.

File specific state information may be maintained on the B blocks. In certain embodiments, this information must survive B block failures. Therefore, it is preferably stored on stable storage to allow stateful B block failover. Other file specific state information to be maintained on, e.g., B blocks includes (1) oplocks maintained per {client, Tid, Fid} (includes state of whether an oplock_break request has been sent), (2) locks (byte-range locks) maintained per {client, Tid, Fid}, and (3) open files maintained per client per Tid (to FLUSH metadata of all files, if Fid=−1; also, used during cleanup if an A block fails or a client reboots).

Failover

Failover provides redundancy so that if one of the protocol termination nodes or file server nodes in a scalable architecture such as the one depicted in FIG. 1 fails, then another one of the protocol termination or file server nodes, as appropriate, takes over servicing a client that had been the responsibility of the failed node. As explained below, failover can be stateful or stateless. Failover of A blocks (protocol termination nodes) will be described first. Failover of B blocks (file server nodes) will be described thereafter.

A block failover may be facilitated by providing all mapping for all shares on all A blocks. Therefore, if one A block fails, then the others have the necessary information to allow file access when any one of them is called upon to take over service. As noted above, a load balancer (e.g., positioned as block 12 in FIG. 1) may decide which A block handles protocol termination when a new client wishes to establish a session. A load balancer may likewise decide which A block should take over when one of its peers fails.

Figure 7A:
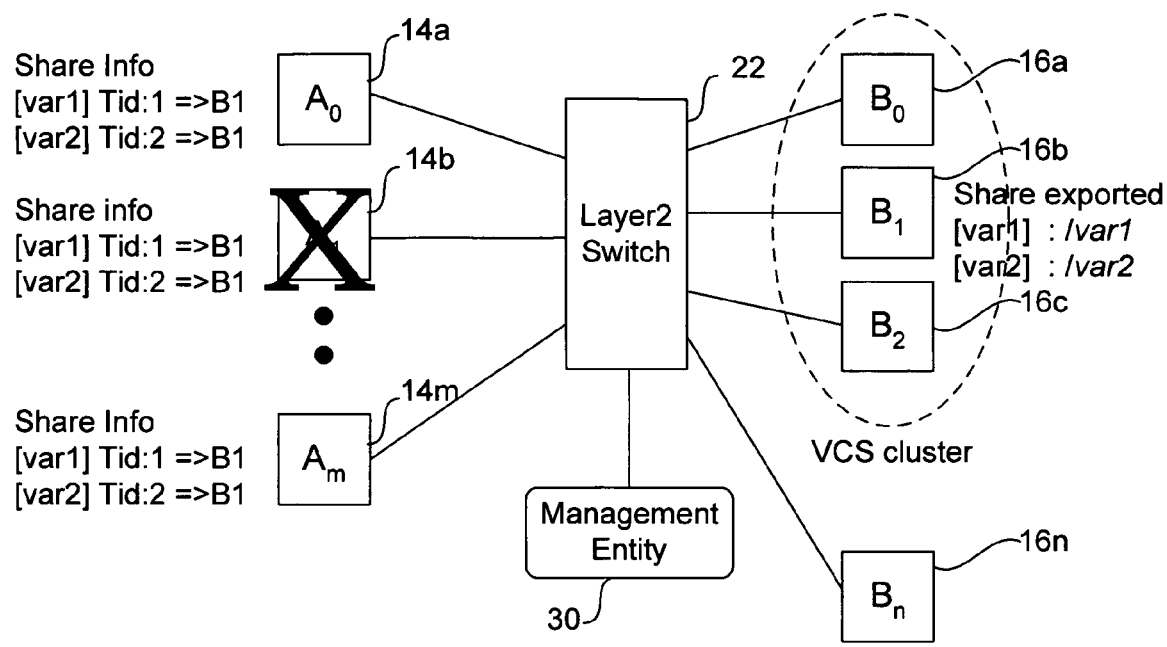
FIG. 7A is a block diagram depicting a sequence of operations during failover of a protocol termination node in accordance with certain embodiments of this invention.

As depicted in FIG. 7A, each of A blocks 14a, 14b, and 14m maintains a mapping of the trees Tid:1 and Tid:2 to file server node B1 (16b). As shown, A block 14a fails to trigger over a termination node failover process. In certain implementations, the client (which was in a session with 14b) sees this as a broken TCP connection to the server. The client then chooses a "retry" option and tries to re-establish the connection with the server. The load balancer 12 forwards this request to the A block 14a (as an example here). The client now establishes a TCP connection to A block 14a and sees the NAS file server as alive. In stateless failover embodiments, where there is no transfer of any state criteria from A block 14b to A block 14a, block 14a sees this as a brand new CIFS connection.

As part of handling the SMB_NEGOTIATE request, block 14a informs the management process of this new client. The management process identifies relevant information about block 14b and the client in its data structures, and sends cleanup messages to the relevant B blocks. These include messages to clean up client information, files open, locks, etc. In certain embodiments, all this cleanup is to be done before the A block 14a responds to the client. Thereafter, block 14a continues a normal session with the client.

Figure 7B:
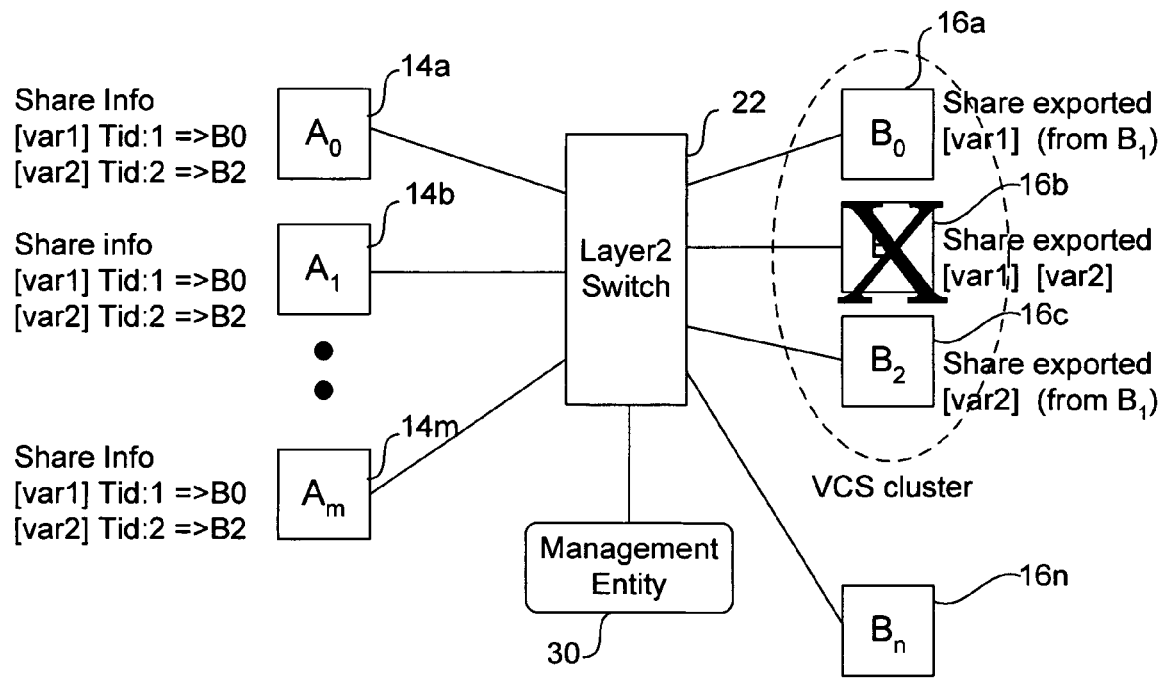
FIG. 7B is a block diagram depicting a sequence of operations during failover of a file server node in accordance with certain embodiments of this invention.

For failover of file server nodes (B blocks), examples of both a stateless and a stateful procedure will be described. FIG. 7B illustrates the general procedure for either case. In this example, nodes in a cluster of file server nodes (B blocks 16a, 16b, and 16c) have the ability to take over responsibility for file trees when one of their peers fail. In the depicted example, node 16b was initially responsible for shares /var1 and /var2. When node 16b fails, share /var1 is exported to node 16a, which takes over responsibility for the share. Further, share /var2 is exported to node 16c, which takes over responsibility for that share.

A stateless B block failover process may involve the following operations. Initially, the management entity determines that a B block B1 has failed and informs the A blocks that B1 has gone down. The A blocks then proactively close TCP connections with clients talking to B1. Other B blocks then take over responsibility for the shares handled by B1. For example, in the scenario depicted in FIG. 7B, a file server node B0 takes over /var1 from B1. Block B0 then notifies all A blocks and Management Entity about the take over. In the current example, node B2 performs the same task for /var2. The A blocks direct future requests for /var1 to B0 and /var2 to B2.

In a variation of the stateless process just described, a management entity informs the A blocks that B1 has gone down. Then for any client request for /var1 or /var2, the A blocks return an invalid Tid error to the client. The client does a TREE_CONNECT and this time the request is forwarded to B0 (for /var1) or B2 (for /var2). In this scheme, the clients can continue working with TREEs not on B1, without resetting TCP connection.

A stateful failover process will now be described. Note that in the certain embodiments described here, a mechanism is required for storing some or all of the client, file, share, and locking state on stable storage such as the memory accessed by the disk controllers 18 (FIG. 1). In a specific example, a disk controller node C1 is providing access to a file server node B1's data structures on the disk and another disk controller node C2 is providing access to another file server node B2's data structures on the disk. Now, assume that the B1 block fails. B2 now takes over for B1 and as part of the failover controls C1 as well. Next, Block B2 notifies the management process and all the relevant A blocks that it is now handling B1's file systems. In response, the A blocks change their mapping of the TiDs from B1 to B2. Note the B_TiD structures need not be modified.

Now when the A block gets a request from the client, such as OPEN request, it looks up the TiD in the SMB header. The A block finds that block B2 is the now handling that file system and forwards the request to block B2, along with the corresponding B_TiD. The B_TiD contains the original_B_ block_id, which helps block B2 determine that it needs to look up data structures being maintained by B1. So it talks to C1 (and not C2) to get access to those. Block B2 continues to have access to the state maintained by B1. So for example, it knows that a file was being locked by a particular client and should not be written by another. In this stateful procedure, the client does not see any impact of the failure of B1.

Locking

Locks may be requested at any time using an SMB locking request. Various types of locks are available. For example, some locks prevent all users from reading and writing. Others simply prevent users from writing, etc. Further, one can define portions of a file to lock (e.g., a byte range within a file). In a preferred embodiment, file states relevant to locking are accessible to both NFS and CIFS. For example, if a CIFS client has locked a file, then an NFS client should not be able to write to it. SMB lock requests will now be described.

An SMB locking request LOCKING_ANDX allows users to specify lock or unlock and byte ranges. This request may be used in two cases: (1) locking and unlocking byte ranges on a file (requested by a client) and (2) requesting an oplock break (asynchronously requested by the server).

Byte range locks and unlocks may have various properties specified such as those listed below.

1. Locking is provided on a per Fid basis. According to the CIFS specification, a Fid returned by the server allows the corresponding file to be accessed by any process using the same transport connection and Tid. The CIFS specification however does not specify if the Tid returned has to be different for different clients. Since the combination Fid+Tid+transport is always unique, locking across machines will work. In other words, the combination unambiguously identifies a file.

2. Multiple byte ranges can be locked or unlocked in a single request. If locking any one of the ranges fails, all previous locks performed as part of this request are unlocked before returning an erroneous reply; i.e., locking is an all or none request.

3. Timeouts can be specified (in milliseconds) for which the server must wait to obtain a lock. This can range from no wait to wait forever.

4. Clients can cancel previously requested, but not yet granted lock requests.

5. Clients can request changes to lock type (from shared to exclusive, for example). If this cannot be performed atomically, the request must be rejected.

Oplocks will now be described. Network performance can be increased if a client does not need to inform the server immediately about every change it makes to a file, or have to worry that other clients can make its information about the file out of date. For example, a client does not have to immediately write information into a file on the server if the client knows that no other process is accessing the data. Likewise, the client can buffer read-ahead data from the file if the client knows that no other process is writing the data. Mechanisms which allow clients to dynamically alter their buffering strategy in a consistent manner are known as "opportunistic locks" or oplocks for short. Versions of the CIFS file sharing protocol including and newer than the "LANMAN1.0" dialect support oplocks. Note, however, that an implementation of even these dialects can implement oplocks trivially by always refusing to grant them.

A client requests an oplock by setting the appropriate bit in the SMB_COM_OPEN_ANDX request when the file is being opened in a mode which is not exclusive. The server responds by setting the appropriate bit in the response SMB indicating whether or not the oplock was granted. By granting the oplock, the server tells the client that the file is currently only being used by this one client process at the current time. The client can therefore safely do read ahead and write behind as well as local caching of file locks knowing that the file will not be accessed/changed in any way by another process while the oplock is in effect. The client will be notified when any other process attempts to open or modify the oplocked file. When another user attempts to open or otherwise modify the file which a client has oplocked, the server delays the second attempt and notifies the client via an SMB_LOCKING_ANDX SMB asynchronously sent from the server to the client. This message has an LOCKING_ANDX_OPLOCK_RELEASE flag set indicating to the client that the oplock is being broken.

There are three different types of oplocks.

A Level II oplock, when held, informs a client that there are multiple concurrent clients of a file, and none has yet modified it. It allows the client to perform reads and file attribute fetches using cached or read-ahead local information, but all other requests have to be sent to the server.

An exclusive oplock, when held, informs a client that it is the only one to have a file open. It allows the client to perform all file operations using cached or read-ahead local information until it closes the file, at which time the server has to be updated with any changes made to the state of the file (contents and attributes).

A batch oplock, when held, informs a client that it is the only one to have a file open. It allows the client to perform all file operations on cached or read-ahead local information (including opens and closes).

If a client holds no oplocks, all requests other than reads must be sent to the server. Reads may be performed using cached or read-ahead data as long as the byte range has been locked by the client; otherwise they too must be sent to the server.

When a client opens a file, it may request that the server grant it an exclusive or batch oplock on the file. The response from the server indicates the type of oplock granted to the client. If cached or read-ahead information was retained after the file was last closed, the client must verify that the last modified time is unchanged when the file is reopened before using the retained information.

When client A opens the file, it can request an exclusive oplock, provided no other client has the file open on the server, then the server may grant the oplock to client A. If, at some point in the future, another client, such as client B, requests an open of the same file, or requests a path name based operation on the file, then the server must tell client A to relinquish its exclusive oplock. If client B's request will not modify the state of the file, the server may tell client A that its exclusive oplock has been replaced by a level II oplock. When a client's exclusive oplock is broken, it must synchronize the server to the local state of the file (contents and attributes) and any locks it holds on the file, and then acknowledge the oplock break request. After the server receives the acknowledgement, if can process B's request.

When client A opens the file, it can request a batch oplock, provided no one else has the file open on the server, then the server may grant the oplock to client A. If, at some point in the future, another client, such as client B, requests any operation on the same file, then the server must tell client A to relinquish its batch oplock. If client B's request will not modify the state of the file (or rename it), the server may tell client A that its batch oplock has been replaced by a level II oplock. If client A has the file open at the time the oplock break request is received, its actions will be the same as if it had an exclusive oplock. If A does not have the file open at the time the oplock break request is received, it sends a close to the server. Once the file is actually closed at the server, client B's open request can be processed.

As indicated, when a client opens a file, it may request an exclusive or batch oplock. If the requested oplock cannot be granted, then the server may grant a Level II oplock if the file currently has an oplock on it. If there is currently an exclusive or batch oplock on the file, it must be broken and the break acknowledged before the open is processed. If there is currently a Level II oplock on the file, it does not need to be broken, and the open may be processed immediately. If any client sends a request to modify the state of a file that has a Level II oplock, the server must ask all clients holding an oplock on the file to break it, but need not wait for an acknowledgement.

An OplockLevel field indicates the type of oplock the client now owns. If OplockLevel is 0, the client possesses no oplocks on the file at all, if OplockLevel is 1 the client possesses a Level II oplock. The client is expected to flush any dirty buffers to the server, submit any file locks and respond to the server with either an SMB_LOCKING_ANDX SMB having the LOCKING_ANDX_OPLOCK_RELEASE flag set, or with a file close if the file is no longer in use by the client.

The SMB_COM_LOCKING_ANDX SMB is used to convey oplock break requests and acknowledgements (as well as lock and unlock requests).

If the client sends an SMB_LOCKING_ANDX SMB with the LOCKING_ANDX_OPLOCK_RELEASE flag set and NumberOfLocks is zero, the server does not send a response. Since a close being sent to the server and break oplock notification from the server could cross on the wire, if the client gets an oplock notification on a file which it does not have open, that notification should be ignored.

In a scalable file server architecture as described herein, the A blocks receive SMB OPEN and LOCK messages that impact locking. An A block receiving such request recognizes it and forwards it (or criteria relevant to locking) to the appropriate B blocks. The B blocks may handle certain aspects of locking/unlocking such as the following.

1. B blocks maintain the state associated with each file.
2. For each file it stores the list of {client, Tid, Fid} pairs, which have locked a particular section of the file.
3. Also, for each file it stores the list of {client, Tid, Fid} pairs, which have been granted oplocks for that file.
4. When a request (say READ) comes in, the B block checks whether any other client has a byte range lock that overlaps with the request. If there is an overlap, then the B block responds to the client with an error.
5. The B block also checks if any oplocks have been granted to any {client, Tid, Fid}.
6. If any oplocks have been granted and they need to be broken or moved to a lower level, the B block sends messages to all those {client, Tid, Fid} pairs.
7. The B block maintains a mapping of clients to A blocks. It sends an asynchronous request to the client via the appropriate A block.

Other Scenarios

Three additional scenarios involving protocols in a scalable network attached storage device will now be described.

In a first scenario, when a client must reboot, the following sequence of operations may apply.

1. Assume that the client is communicating with block A1 when it must reboot.
2. The client comes back up and tries to re-establish the connection with the server.
3. Assume that a load balancer forwards this request to block A2.
4. The client now establishes a TCP connection to block A2 and sees the NAS file server as alive.
5. In this embodiment, no state information is transferred from block A1 to block A2, and the A2 block sees this as a new CIFS connection.
6. As part of handling the SMB_NEGOTIATE request, block A2 lets a management process know about this new client.
7. The management process looks up in its data structures, and sends cleanup messages to the relevant B blocks and A1 block.
8. All the cleanup is to be done before the A2 block responds to the client.
9. The A2 block continues a normal session with the client.

In the next scenario, a TCP connection goes down. In certain embodiments, the file server handles this scenario as follows.

1. Assume that the TCP connection for the client communicating with block A1 goes down.
2. The client tries to re-establish the connection with the server.
3. Assume that the load balancer forwards this request to block A2.
4. The client now establishes a TCP connection to A2.
5. Because there will be no state transfer from block A1 to block A2, the A2 block sees this as a new CIFS connection.
6. As part of handling the SMB_NEGOTIATE request, the A2 block lets the management process know about this new client.
7. The management process looks up in its data structures, and sends cleanup messages to the relevant B blocks and A1 block.
8. All cleanup is to be done before the A2 block responds to the client.
9. A2 continues a normal session with the client.

In a third scenario, the client crashes and never reconnects to the file server.

1. TCP keep alive messages from the A block to the client determine that a client has gone down.
2. The A block lets the management process know about the client going down.
3. The management process looks up in its data structures, and sends cleanup messages to the relevant B blocks and A block.
4. B blocks perform cleanup.

The embodiments of the present invention described above are to be considered as illustrative and not restrictive. The invention is not to be limited to the details given herein, but may be modified within the scope and equivalents of the appended claims.

What is claimed is:

1. A scalable network attached storage system comprising:
  one or more termination nodes;
  one or more file server nodes in communication with the one or more termination nodes for maintaining file systems, wherein the file server nodes are together responsible for a plurality of trees of the file systems, wherein each of the plurality of trees is a server message block (SMB) share; and
  a switching fabric coupling the one or more termination nodes and file server nodes, wherein the one or more termination nodes and file server nodes can be added to or deleted from the scalable network attached storage system as needed, wherein the one or more termination nodes are configured to communicate with users via CIFS protocol;

wherein the one or more termination nodes are configured to (i) receive a Server Message Block (SMB) TREE CONNECT message from a user, which TREE CONNECT message identifies a share to be accessed by the user, (ii) determine which file server node is responsible for a tree identified in the TREE CONNECT message, (iii) send the TREE CONNECT message to the file server node determined to be responsible, and (iv) send a response to the user, which response identifies a Tid to be used by the user to identify said share.

2. The storage system of claim 1, wherein the one or more termination nodes are configured to (i) receive a user's credentials and (ii) forward said credentials to a management entity or domain controller responsible for authenticating users.

3. The storage system of claim 1, wherein the termination nodes are configured to (i) receive a request from the user to lock a selected file or portion of a file stored on the network attached storage system, and (ii) provide the request or at least criteria pertaining to locking from the selected termination node to one of the file server nodes responsible for the file for which the lock request was made, and wherein the file server nodes are configured to maintain state information pertaining to the locked file or portion of the file.

4. The storage system of claim 1, wherein the storage system is configured to (i) determine that a protocol termination node has failed, wherein the failed protocol termination node had established a session with a client at the time when it failed, (ii) designate another protocol termination node to handle subsequent communication with the client, and (iii) start a new session between the client and the other protocol termination node.

5. The storage system of claim 1, wherein the storage system is configured to (i) determine that a file server node has failed, wherein the failed file server node was responsible for handling access to one or more of the plurality of trees, (ii) identify one or more peer file server nodes to handle the trees of the failed file server node, and (iii) allow a client to access one or more files in the trees of the failed file server node by providing access through the one or more peer file server nodes identified to handle said trees.

6. The storage system of claim 1, wherein the termination nodes are configured to (i) receive a Tid from the user, wherein the Tid identifies one of the plurality of trees in the file system, (ii) determine which file server node is responsible for a tree identified by the Tid, and (iii) send a request for access to the file server node determined to be responsible;

wherein the responsible file server node is configured to (i) identify the actual file associated with an operation via an Fid carried in the request, wherein the Fid identifies a file to be accessed, (ii) determine that the user has appropriate permissions for that Fid, and (iii) allow the user to access the file.

7. The storage system of claim 1, further comprising one or more disk controller nodes for accessing storage disks.

8. The scalable network attached storage system as recited in claim 1, wherein each of the file server nodes is responsible for a different set of the plurality of trees of the file systems.

9. The scalable network attached storage system as recited in claim 8, wherein each of the file server nodes is responsible for providing access to files of the set of the plurality of trees for which it is responsible.

10. The scalable network attached storage system as recited in claim 9, wherein the access includes at least one of creating one of the files, writing to one of the files, flushing one of the files, or renaming one of the files.

11. The scalable network attached storage system as recited in claim 9, wherein the access includes at least one of moving one of the files to another one of the plurality of trees or copying one of the files to another one of the plurality of trees.

12. The scalable network attached storage system as recited in claim 8, wherein each of the file server nodes maintains state information associated with locks pertaining to files of the set of the plurality of trees for which it is responsible.

13. The scalable network attached storage system as recited in claim 1, wherein the file server nodes are responsible for maintaining state information associated with locks pertaining to files in the plurality of trees.

14. The scalable network attached storage system as recited in claim 1, wherein each of the trees identifies one or more files.

15. The scalable network attached storage system as recited in claim 1, wherein the file server nodes are not nodes of the plurality of trees.

16. The scalable network attached storage system as recited in claim 1, wherein each of the file server nodes maintains a root of each of the plurality of trees for which it is responsible.

17. The scalable network attached storage system as recited in claim 1, wherein each of the plurality of trees is accessible via a corresponding single one of the file server nodes at a given point in time.

18. A scalable network attached storage system comprising:

one or more termination nodes;

one or more file server nodes in communication with the one or more termination nodes for maintaining file systems; and a switching fabric coupling the one or more termination nodes and file server nodes, wherein the one or more termination nodes and file server nodes can be added to or deleted from the scalable network attached storage system as needed, and wherein the one or more termination nodes are configured to communicate with users via CIFS protocol;

wherein the one or more termination nodes are configured to (i) receive a Server Message Block (SMB) TREE_CONNECT message from a user, which TREE_CONNECT message identifies a share to be accessed by the user, (ii) determine which file server node is responsible for a tree identified in the TREE_CONNECT message, (iii) send the TREE_CONNECT message to the file server node determined to be responsible, and (iv) send a response to the user, which response identifies a Tid to be used by the user to identify said share.

19. A method of connecting a user to a file system tree maintained on a scalable network attached storage system using CIFS protocol, the network attached storage system comprising: (i) one or more termination nodes and (ii) one or more file server nodes in communication with the one or more termination nodes for maintaining file systems, wherein the one or more termination nodes and file server nodes can be added to or deleted from the scalable network attached storage system as needed, the method comprising:
- receiving a Server Message Block (SMB) TREE_CONNECT message at a selected termination node;
- determining which file server node is responsible for a tree identified in the TREE_CONNECT message;
- sending the TREE_CONNECT message to the file server node determined to be responsible;
- determining a tree ID used by the file server node for the share;
- providing the tree ID used by the file server node to the selected termination node;
- generating a Tid at the selected termination node, which Tid identifies the share; and
- sending a response including the Tid to the user.

20. The method of claim 19, further comprising authenticating the users access to the share.

21. The method of claim 20, wherein authenticating the user's access to the share is performed by a management process on the network attached storage system.

22. The method of claim 19, wherein the Tid is generated on a per client basis.

* * * * *